(12) United States Patent
Matsufuji

(10) Patent No.: US 7,410,679 B2
(45) Date of Patent: Aug. 12, 2008

(54) OPTICAL COMPENSATION SHEET, POLARIZING PLATE AND LIQUID CRYSTAL DISPLAY

(75) Inventor: Akihiro Matsufuji, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 325 days.

(21) Appl. No.: 11/378,481

(22) Filed: Mar. 20, 2006

(65) Prior Publication Data

US 2006/0221275 A1  Oct. 5, 2006

(30) Foreign Application Priority Data

Mar. 22, 2005   (JP)  ............ P.2005-082724

(51) Int. Cl.
*G02F 1/13363* (2006.01)
(52) U.S. Cl. ............ 428/1.3; 349/117; 349/118
(58) Field of Classification Search .......... 428/1.1, 428/1.3, 1.54; 349/117–121
See application file for complete search history.

(56) References Cited

U.S. PATENT DOCUMENTS

2004/0233363 A1* 11/2004 Murayama et al. .......... 349/117
2006/0221275 A1* 10/2006 Matsufuji .................... 349/96

FOREIGN PATENT DOCUMENTS

| JP | 2002-192541 A | 7/2002 |
|----|---------------|--------|
| JP | 2003-344657 A | 12/2003 |
| WO | WO-2004/068226 A1 | 8/2004 |

* cited by examiner

*Primary Examiner*—Terrel Morris
*Assistant Examiner*—Sophie Hon
(74) *Attorney, Agent, or Firm*—Birch, Stewart, Kolasch & Birch, LLP

(57) ABSTRACT

An optical compensation sheet is provided and includes: a cellulose acylate film having optical anisotropy and meeting all of requirements represented by the following expressions (1) to (3); and an optically anisotropic layer having a slow axis orthogonal to a slow axis of the cellulose acylate film.

| $2.6 \leq X+Y < 3.0$ | Expression (1) |
| $0 \leq X \leq 1.8$ | Expression (2) |
| $1.0 \leq Y < 3.0$ | Expression (3) |

X represents a substitution degree of acetyl group and Y represents a total sum of substitution degrees of propionyl, butanoyl, pentanoyl and hexanoyl groups.

13 Claims, 2 Drawing Sheets

OPTICAL COMPENSATION SHEET, POLARIZING PLATE AND LIQUID CRYSTAL DISPLAY

FIELD OF THE INVENTION

The present invention relates to an optical compensation sheet, a polarizing plate and a liquid crystal display.

BACKGROUND OF THE INVENTION

Liquid crystal displays are expanding the range of their uses year after year because of their low power consumption and high space-saving rate as image display devices. Although great viewing-angle dependence of images and slow display response were major drawbacks to liquid crystal displays in the past, fast-response VA mode liquid crystal display models with wide viewing angles have recently been commercialized, and thereby the demand for liquid crystal displays is rapidly growing even in the market requiring high-quality images, such as the TV-set market. With this growing demand, further improvement in optical compensating power has been required for optical compensation members used in liquid crystal displays for the purpose of improving hue, contrast and viewing-angle dependences of these factors.

With respect to optical compensation films for VA mode liquid crystal displays, it is known that a combination of A-plate and C-plate compensation films in particular has a highly improving effect on viewing-angle dependence of contrast.

Further, WO 2004/068226 discloses the art of performing optical compensation by use of polymer films differing in wavelength dispersion between in-plane retardation and retardation in the direction of thickness (hereinafter referred to as thickness-direction retardation), thereby further improving the contrast and bringing the hue in black display close to gray.

However, such an art is insufficient to produce an effect of reducing viewing-angle dependence of hue, so improvements in this point have been required.

With respect to the birefringent films whose in-plane retardation and thickness-direction retardation are controlled, there are known the method of stretching a cellulose acylate film to which a retardation developing agent is added (JP-A-2002-192541) and the method of deforming a polymer substrate coated with a polymer capable of aligning (JP-A-2003-344657). However, such methods pose limitations to the range of retardation control and are insufficient in point of hue changes by viewing angles.

SUMMARY OF THE INVENTION

An object of an illustrative, non-limiting embodiment of the invention is to provide an optical compensation sheet, which can ensure high-quality images with a slight change in hue of display color when the screen is viewed from oblique directions. Another object of an illustrative non-limiting embodiment of the invention is to provide a polarizing plate and a liquid crystal display, which each have such an optical compensation sheet.

As a result of our intensive studies, it has been found that the change in hue is ascribable to a change in wavelength dispersion, it becomes greater when wavelength dependences of retardation Re and retardation Rth are both greater on a short-wavelength side than on a long-wavelength side, and it can be reduced by controlling Re so as to have smaller values on the short-wavelength side than those on the long-wavelength side.

And it has also been found that optical compensation members as specified below can realize ideal wavelength dispersion characteristics of retardation and ensure slight viewing-angle dependences of hue and black display when used in liquid crystal displays, thereby achieving the invention.

(1) An optical compensation sheet including: a cellulose acylate film having optical anisotropy and meeting all of requirements represented by the following expressions (1) to (3); and an optically anisotropic layer having a slow axis orthogonal to a slow axis of the cellulose acylate film:

$$2.6 \leq X+Y < 3.0 \qquad \text{Expression (1)}$$

$$0 \leq X \leq 1.8 \qquad \text{Expression (2)}$$

$$1.0 \leq Y < 3.0 \qquad \text{Expression (3)}$$

wherein X represents a substitution degree of acetyl group and Y represents a total sum of substitution degrees of propionyl, butanoyl, pentanoyl and hexanoyl groups.

(2) An optical compensation sheet including: a cellulose acylate film having optical anisotropy; and an optically-anisotropic layer having a slow axis orthogonal to a slow axis of the cellulose acylate film, the optical compensation sheet having retardations satisfying the following relations (1) and (2);

$$Re(446) < Re(590) < R(749) \qquad (1)$$

$$Rth(446) > Rth(590) > Rth(749) \qquad (2)$$

wherein $Re(\lambda)$ is an in-plane retardation by nm at a wavelength of $\lambda$ nm and $Rth(\lambda)$ is a thickness-direction retardation expressed by nm at a wavelength of $\lambda$ nm.

(3) An optical compensation sheet as described in (1) or (2), having retardations satisfying the following relations (3) and (4);

$$5 < Re(749) - Re(446) < 100 \qquad (3)$$

$$5 < Rth(446) - Rth(749) < 100 \qquad (4)$$

(4) An optical compensation sheet as described in any of (1) to (3), wherein the optically anisotropic layer has an optical absorption end at a wavelength longer than the wavelength at which the cellulose acylate film has an optical absorption end.

(5) An optical compensation sheet as described in any of (1) to (4), wherein an Re(590) of the optically anisotropic layer is smaller than an Re(590) of the cellulose acylate film.

(6) A polarizing plate having a polarizer and two protective films, the polarizer being between the two protective films, wherein at least one of the two protective films is an optical compensation sheet as described in any of (1) to (5).

(7) A liquid crystal display having a liquid crystal cell and two polarizing plates, the liquid crystal cell being between the two polarizing plates, wherein at least one of the two polarizing plates is a polarizing plate as described in (6).

(8) A liquid crystal display as described in (7), wherein the liquid crystal cell is a VA mode liquid crystal cell.

In accordance with the invention, it becomes possible to provide an optical compensation sheet capable of ensuring high-quality images with a slight change in hue of display color when viewed from oblique directions, and a polarizing plate and a liquid crystal display which each have such an optical compensation sheet.

DETAILED DESCRIPTION OF THE INVENTION

Figure 1:
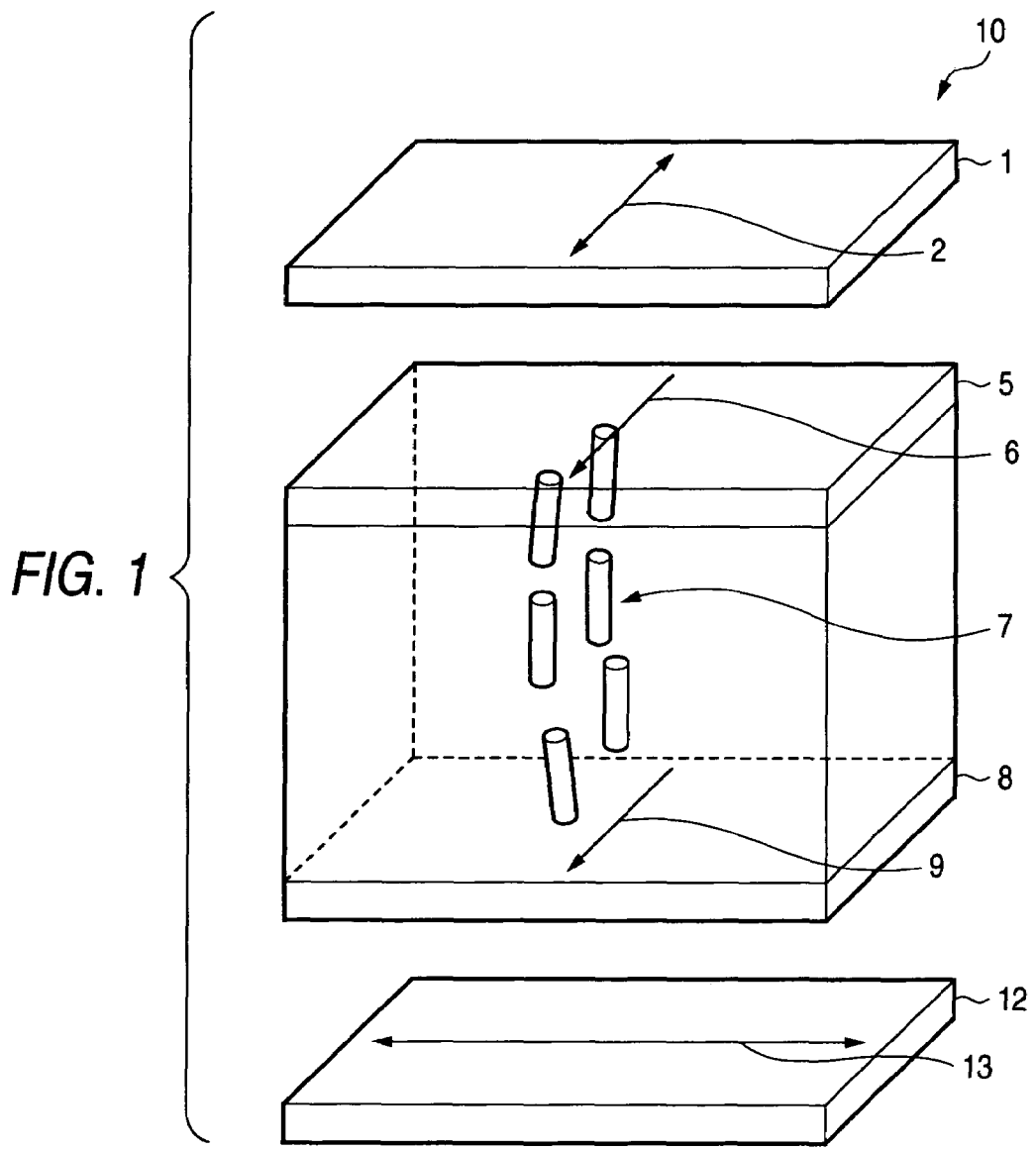
FIG. 1 is a schematic diagram showing an exemplary embodiment of a liquid crystal display of the invention.

Exemplary embodiments of the invention is described below in greater detail.

The retardation Re and the retardation Rth in the specification represent in-plane retardation and thickness-direction retardation, respectively. $Re(\lambda)$ is measured with KOBRA WR (made by Oji Scientific Instruments) as light with a wavelength of $\lambda$ nm is made to strike upon a film in the direction of the normal to the film surface. On the other hand, $Rth(\lambda)$ is calculated from nx, ny and nz determined by the cellulose acylate's average refractive index of 1.48 and a film thickness on the basis of the retardation value $Re(\lambda)$ and a retardation value measured under conditions that the in-plane slow axis (judged by use of KOBRA WR) is taken as an axis of tilt (rotation axis) and light with a wavelength of $\lambda$nm is made to strike from a direction tilting to +40° with respect to the direction of the normal to the film.

As to the suitable retardation values of the present optical compensation sheet, though they vary by optical characteristics of a liquid crystal panel used, Re(590) is preferably from 30 nm to 150 nm and Rth (590) is preferably from 100 nm to 400 nm.

A present optical compensation sheet meets the following conditions (1) and (2) for the purpose of enhancing effects on contrast and hue improvements. It is particularly required that there is an inverse relationship between the wavelength dispersion of Re and that of Rth, and it is preferable that Re on the short wavelength side is smaller than Re on the long wavelength side and Rth on the short wavelength side is greater than Rth on the long wavelength side.

$$Re(446)<Re(590)<Re(749) \quad (1)$$

$$Rth(446)<Rth(590)<Rth(749) \quad (2)$$

In the above relation, $Re(\lambda)$ is an in-plane retardation (unit: nm) at a wavelength of $\lambda$nm and $Rth(\lambda)$ is a thickness-direction retardation (unit: nm) at a wavelength of $\lambda$nm.

For the purpose of further reducing changes in hue by viewing angles, it is preferable that the present optical compensation sheet meets the following conditions (3) and (4), though the preferred ranges vary by characteristics of a liquid crystal cell used.

$$5<Re(749)-Re(446)<100 \quad (3)$$

$$5<Rth(446)-Rth(749)<100 \quad (4)$$

As described above, a difference between Re values on the long wavelength side and on the short wavelength side (Re (749)–Re(446)) is preferably greater than 5 nm and smaller than 100 nm, far preferably from 10 nm to 90 nm, particularly preferably from 20 nm to 80 nm.

A difference between Rth values on the short wavelength side and on the long wavelength side (Rth(446)–Rth(749)) is preferably greater than 5 nm and smaller than 100 nm, far preferably from 10 nm to 90 nm, particularly preferably from 20 nm to 80 nm.

An optical compensation sheet meeting those conditions can be made by coating an optically anisotropic cellulose acylate film, to which a slow axis is given in advance in the width direction by drawing the film in a tenter direction, with an optically anisotropic layer having a slow axis in the length direction.

<Cellulose Acylate Film having Optical Anisotropy>

In the first place, a cellulose acylate film having optical anisotropy (hereinafter referred to as a cellulose acylate film according to the invention in some cases) is explained.

Cellulose acylate films have hitherto been used for photographic supports and various optical materials because of their toughness and flame retardancy. In recent years, they have been frequently used as transparent optical films for liquid crystal displays in particular. Since cellulose acylate films have high optical transparency and high optical isotropy, they are excellent for use as optical materials for apparatus dealing with polarization, such as liquid crystal displays, so they have hitherto been used as protective films of polarizers or supports of optical compensation films capable of improving displays viewed from oblique directions (viewing-angle compensation).

In the second place, a method of preparing cellulose acylate used in the invention is described in detail. As to raw cotton and synthesis methods of cellulose acylate usable in the invention, those are also described in detail in *Journal of Technical Disclosure*, No. 2001-1745, pp. 7-12 (Mar. 15, 2001), issued by The Japan Institute of Invention and Innovation (the JIII).

(Raw Material and Pretreatment)

As raw materials of cellulose acylate for use in the invention, cellulose materials derived from hardwood pulp, softwood pulp and cotton linters can be used suitably. As the raw materials of cellulose, it is preferable to use high-purity cellulose materials ranging in α-cellulose content from 92 mass % (weight %) to 99.9 mass %.

When a cellulose material is in the form of film or clusters, it is preferable to crush the material into pieces in advance. In the process of crushing, it is advantageous that the cellulose material reaches the stage where it is crushed into fine powder or feathers.

(Activation)

It is preferable that the cellulose material undergoes contact treatment with an activator (activation) prior to acylation. The activator usable herein is a carboxylic acid or water. When water is used as the activator, it is preferable that a procedure carried out after the activation includes steps of removing water by excessive addition of an acid anhydride, washing with a carboxylic acid for replacement of water and adjusting the condition for acylation. The activator may be added at an arbitrarily adjusted temperature, and the method for its addition can be chosen from a spraying method, a dripping method or an immersion method.

Examples of an carboxylic acid suitable as the activator include 2-7C carboxylic acids (such as acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid). Of these carboxylic acids, acetic acid, propionic acid and butyric acid are preferable to the others, and acetic acid is especially preferred.

At the time of acylation, it is also possible to add an acylation catalyst, such as sulfuric acid, as required. However, addition of a strong acid like sulfuric acid occasionally causes acceleration of depolymerization, so it is appropriate that the addition amount of sulfuric acid be kept within the range of 0.1 to 10 mass % of the amount of cellulose to be activated. In addition, two or more of activators may be used in combination, and anhydrides of 2-7C carboxylic acids may be added.

The addition amount of the activators is preferably at least 5 mass %, far preferably 10 mass % or above, particularly preferably 30 mass % or above, of the amount of cellulose to be activated. As far as the amount of activators added is greater than the lower limit, the activation can progress well without problems including a drop in degree of cellulose activation. The amount of activators added has no particular restriction as to its upper limit so far as it causes no drop in productivity, but the upper limit is preferably 100 times or below by mass, far preferably 20 times or below by mass, particularly preferably 10 times or below by mass, as much as the amount of cellulose used. The activation may be performed under a condition that a large excess of activators is added to cellulose, and thereafter the amount of the activators may be reduced by performing operations, such as filtration, drying by ventilation, drying by heating, reduced-pressure distillation and replacement with a solvent.

It is preferable that the activation time is 20 minutes or above. The upper limit of the activation time has no particular restriction so far as it has no influence upon productivity, but it is preferably 72 hours or below, far preferably 24 hours or below, particularly preferably 12 hours or below. In addition, the activation temperature is preferably from 0° C. to 90° C., far preferably from 15° C. to 80° C., particularly preferably from 20° C. to 60° C. The process of cellulose activation may be carried out under a pressurized condition or a reduced-pressure condition. For the application of heat, electromagnetic waves, such as microwaves or infrared rays, may be utilized.

(Acylation)

As a method of preparing the cellulose acylate for use in the invention, it is appropriate to adopt a method in which hydroxyl groups of cellulose are acylated by adding one or more of a carboxylic acid anhydride to cellulose and causing reaction between them in the presence of a BrØnsted acid or a Lewis acid as a catalyst.

Descriptions of cellulose acylates having great degrees of 6-position substitution can be found, e.g., in JP-A-11-5851, JP-A-2002-212338 and JP-A-2002-338601.

As other methods of preparing cellulose acylate, a method in which cellulose is allowed to react with a carboxylic acid anhydride or halide in the presence of a base (such as sodium hydroxide, potassium hydroxide, barium hydroxide, sodium carbonate, pyridine, triethylamine, potassium t-butoxide, sodium methoxide or sodium ethoxide) and a method of using as an acylation agent a mixed-acid anhydride (such as anhydride of a carboxylic acid-trifluroacetic acid mixture or anhydride of a caboxylic acid-methanesulfonic acid mixture) can also be adopted. The latter method in particular is effective in introducing an acyl group containing many carbon atoms or an acyl group difficult to introduce by acylation utilizing a combination of a carboxylic acid anhydride, acetic acid and a sulfuric acid catalyst.

Examples of a method usable for preparing a mixed acylate of cellulose include a method of adding as an acylation agent two types of carboxylic acid anhydrides in a mixed state or one after another; a method of using an anhydride of a mixture of two types of carboxylic acids (e.g., an anhydride of a acetic acid-propionic acid mixture); a method of preparing a mixed acid anhydride inside a reaction system by using as raw materials a carboxylic acid and an anhydride of another carboxylic acid (e.g., acetic acid and propionic anhydride) and allowing the acid anhydride prepared to react with cellulose; and a method of once preparing a cellulose acylate having a substitution degree lower than 3 and then further acylating residual hydroxyl groups by use of an acid anhydride or an acid halide.

(Carboxylic Acid Anhydride)

As carboxylic acid anhydrides, anhydrides of carboxylic acids which each contain 2 to 7 carbon atoms are suitable. Examples of such acid anhydrides include acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexanecarboxylic anhydride and benzoic anhydride.

Preferred as carboxylic acid anhydrides are acetic anhydride, propionic anhydride, butyric anhydride, valeric anhydride, hexanoic anhydride and heptanoic anhydride, and especially preferred are acetic anhydride, propionic anhydride and butyric anhydride.

For the purpose of preparing a mixed ester, combined use of those acid anhydrides is favorably adopted. Herein, it is preferable that the mixing ratio between acid anhydrides is determined according to the intended substitution ratio in the mixed ester. In general, it is advantageous that acid anhydrides in an excessive amount on an equivalent weight basis are added to cellulose. Specifically, it is appropriate that the amount of acid anhydrides added be 1.2 to 50 times, preferably 1.5 to 30 times, particularly preferably 2 to 10 times, as much as the equivalent weight of cellulose based on its hydroxyl groups.

(Catalyst)

An acylation catalyst used for preparing cellulose acylate in the invention is preferably a BrØnsted acid or a Lewis acid. The definitions of a BrØnsted acid or a Lewis acid are described, e.g., in *Rikagaku Jiten*, 5 th ed. (2000). Suitable examples of a BrØnsted acid include sulfuric acid, perchloric acid, phosphoric acid, methanesulfonic acid, benzenesulfonic acid and toluenesulfonic acid. Suitable examples of a Lewis acid include zinc chloride, tin chloride, antimony chloride and magnesium chloride.

Of those catalysts, sulfuric acid or perchloric acid is preferable to the others, and sulfuric acid is especially preferred. The suitable amount of a catalyst added is from 0.1 to 30 mass %, preferably from 1 to 15 mass %, particularly preferably from 3 to 12 mass %, of the amount of cellulose used.

(Solvent)

In carrying out the acylation of cellulose, a solvent may be added for the control of viscosity, reaction speed, stirring efficiency and substitution ratio between acyl groups. Examples of a solvent usable for this purpose include dichloromethane, chloroform, carboxylic acids, acetone, ethyl methyl ketone, toluene, dimethyl sulfoxide and sulfolane. Of these solvents, carboxylic acids are preferred over the others, and examples thereof include 2-7C carboxylic acids (such as acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-direthylbutyric acid, 2,3-dimethylbutyric acid, 3,3-dimethylbutyric acid and cyclopentanecarboxylic acid).

among these carboxylic acids, acetic acid, propionic acid and butyric acid are preferable to the others. These solvents may be used as a mixture of two or more thereof.

(Conditions for Acylation)

In carrying out acylation of cellulose, there's nothing wrong with mixing one or more acid anhydrides and a catalyst first, if needed, together with a solvent, and then mixing with cellulose.

Alternatively, those chemicals may be successively mixed one by one with cellulose. In general, however, it is preferable that an acylation agent is prepared first by mixing acid anhydrides and a catalyst, or by mixing acid anhydrides, a catalyst and a solvent, and then made to react with cellulose. For the purpose of preventing the temperature inside a reaction vessel from rising by reaction heat evolved during the acylation, it is favorable that the acylation agent is cooled in advance. The temperature of the acylation agent cooled is preferably from −50° C. to 20° C., far preferably from −35° C. to 10° C., particularly preferably from −25° C. to 5° C. The acylation agent may be added in a liquid state, or in a state of its being frozen into crystalline, flaky or block solid.

All of the acylation agent may be added to cellulose at once, or the acylation agent may be divided into fractions and added in succession to cellulose. Alternatively, all of the cellulose may be added to the acylation agent at once, or the cellulose may be divided into portions and added in succession to the acylation agent. In the case of divided addition of the acylation agent, the fractions of the acylation agent may be the same or different in composition. Suitable examples of a method for divided addition include (1) the method of firstly adding a mixture of one or more acid anhydrides and a solvent, and then adding thereto a catalyst, (2) the method of firstly adding a mixture of one or more acid anhydrides, a solvent and a portion of catalyst, and then adding thereto a mixture of the remainder of the catalyst and a solvent, (3) the method of firstly adding a mixture of one or more acid anhydrides and a solvent, and then adding thereto a mixture of a catalyst and a solvent, and (4) the method of firstly adding a solvent, and then adding thereto a mixture of one or more acid anhydrides and a catalyst, or a mixture of one or more acid anhydrides, a catalyst and a solvent.

Although the acylation of cellulose is an exothermic reaction, it is appropriate that the highest temperature reached during acylation be 50° C. or below in the method of preparing the cellulose acylate for use in the invention. This is because, as far as the reaction temperature is 50° C. or below, there doesn't occur such a problem that depolymerization proceeds and makes it difficult to get cellulose acylate having a polymerization degree suitable for use in the invention. The highest temperature reached during the acylation is preferably 45° C. or below, far preferably 40° C. or below, particularly preferably 35° C. or below. The reaction temperature may be controlled by use of a temperature controller or by an initial temperature of the acylation agent used. Alternatively, the reaction temperature may be controlled by reducing the inside pressure of a reaction vessel and causing heat absorption through vaporization of a liquid component in the reaction system. The heat generation during the acylation is great in the initial stage of the reaction, so it is possible to adopt a control method of cooling the reaction system in the initial reaction stage alone and thereafter heating it. The endpoint of the acylation can be determined by measurements of light-beam transmittance, solution's viscosity, temperature changes in the reaction system or product solubility in an organic solvent, or by observation under a polarizing microscope.

The lowest temperature during the acylation reaction is preferably −50° C. or above, far preferably −30° C. or above, particularly preferably −20° C. or above. The suitable acylation time is from 0.5 to 24 hours, preferably from 1 to 12 hours, particularly preferably from 1.5 to 6 hours. The reaction time shorter than 0.5 hour is undesirable because the reaction does not progress to the full under usual reaction conditions, and the reaction time longer than 24 hours is also undesirable from the viewpoint of industrial-scale production.

(Reaction-Stop Agent)

In the method of preparing the cellulose acylate for use in the invention, it is preferable that a reaction-stop agent is added after the acylation reaction.

As the reaction-stop agent, any of compounds may be used as long as they can decompose acid anhydrides. Suitable examples of the reaction-stop agent include water, alcohol (e.g., methanol, ethanol, propanol, isopropyl alcohol) and compositions containing them. The reaction-stop agents may include neutralization agents described hereinafter. In order to avoid such a problem that the addition of a reaction-stop agent causes generation of heat greater than the cooling capacity of a reactor, thereby lowering the polymerization degree of the cellulose acylate produced, or precipitation of cellulose acylate in an unwanted form, the addition of a mixture of water with a carboxylic acid, such as acetic acid, propionic acid or buryric acid, is preferable to the direct addition of water or alcohol. Herein, acetic acid is especially suitable as the carboxylic acid. Water and a carboxylic acid may be mixed in an arbitrary proportion, but it is appropriate that the water content in the mixture be from 5 mass % to 80 mass %, preferably from 10 mass % to 60 mass %, particularly preferably from 15 mass % to 50 mass %.

The reaction-stop agent may be added to a reaction vessel for acylation, or the reaction product may be added to a vessel in which the reaction-stop agent is contained. It is appropriate that a time from 3 minutes to 3 hours be spent on addition of the reaction-stop agent. This is because, as long as the addition time of the reaction-stop agent is 3 minutes or longer, heat evolution is not so great as to cause problems that the polymerization degree is lowered, hydrolysis of acid anhydrides becomes insufficient and the stability of the cellulose acetate is reduced. On the other hand, as long as the reaction-stop agent is added within a period of 3 hours, such a problem that the productivity on an industrial scale is lowered does not occur. The addition time of the reaction-stop agent is preferably from 4 minutes to 2 hours, far preferably from 5 minutes to 1 hour, particularly preferably from 10 minutes to 45 minutes. In adding the reaction-stop agent, the reaction vessel may be cooled, or need not be cooled. However, it is favorable for the purpose of suppressing depolymerization that the reaction vessel is cooled and thereby a temperature rise is controlled. And it is also preferable to cool the reaction-stop agent.

(Neutralization Agent)

During or after the acylation reaction stop process, a neutralization agent (such as calcium, magnesium, iron, aluminum or zinc carbonate, acetate, hydroxide or oxide) or a solution thereof may be added for the purposes of hydrolyzing an excess of carboxylic acid anhydride remaining in the reaction system and neutralizing part or all of carboxylic acid and esterification catalyst. Suitable examples of a solvent for such a neutralization agent include polar solvents, such as water, alcohol (e.g., ethanol, methanol, propanol, isopropyl alcohol), carboxylic acids (e.g., acetic acid, propionic acid, butyric acid), ketones (e.g., acetone, ethyl methyl ketone) and dimethyl sulfoxide, and mixtures of two or more of those solvents.

(Partial Hydrolysis)

Although the thus prepared cellulose acylate has a total substitution degree close to 3, the degree of acyl substitution in the cellulose acylate is generally reduced to the desired order (or ripened) by allowing the cellulose acylate to stand in the presence of a small amount of a catalyst (generally a remaining acylation catalyst, such as sulfuric acid) and water at a temperature of 20° C. to 90° C. for a period of several minutes to several days to cause partial hydrolysis of ester linkages. In the process of the partial hydrolysis, sulfuric acid ester of cellulose is also hydrolyzed, so the quantity of sulfate attached to the cellulose can be reduced by control of hydrolysis conditions.

(Stop of Partial Hydrolysis)

At time of obtaining the intended cellulose acylate, it is preferable that the partial hydrolysis is stopped by thoroughly neutralizing the catalyst remaining in the reaction system by use of a neutralizing agent or its solution as mentioned above. And it is also preferable that the catalyst (e.g., sulfuric acid ester) in the solution or attached to the cellulose is removed effectively by adding a neutralizing agent (e.g., magnesium carbonate, magnesium acetate) which can produce a salt having low solubility in the reaction solution.

A cellulose acylate for use in the invention is required to meet all the requirements represented by the following expressions (1) to (3).

$$2.6 \leq X+Y < 3.0 \quad \text{Expression (1)}$$

$$0 \leq X \leq 1.8 \quad \text{Expression (2)}$$

$$1.0 \leq Y < 3.0 \quad \text{Expression (3)}$$

In the expressions (1) to (3), X represents a substitution degree of acetyl group and Y represents a total sum of substitution degrees of propionyl, butanoyl, pentanoyl and hexanoyl groups.

By meeting all the requirements represented by expressions (1) to (3), physical properties, optical properties, solubility and fusibility required of the cellulose acylate for use in the invention can be fulfilled.

Further, where Expression (1) is concerned, $2.6 \leq X+Y \leq 2.8$ is preferable; where Expression (2) is concerned, $1.0 \leq X \leq 1.7$ is preferable; and where Expression (3) is concerned, $1.2 \leq Y \leq 1.8$ is preferable.

The average acyl-group substitution degree of the cellulose acyalte for use in the invention can be determined using the method according to ASTM D-817-91, the method of completely hydrolyzing the cellulose acylate and measuring the quantity of the thus liberated carboxylic acids or salts thereof by gas chromatography or high-performance liquid chromatography and the method utilizing $^1$H-NMR or $^{13}$C-NMR singly or in combination.

(Filtration)

For the purpose of removing or reducing unreacted ingredients, slightly soluble salts and other extraneous substances in the acylation product of cellulose, the reaction mixture is preferably subjected to filtration. The filtration may be carried out in any process step between the conclusion of acylation and reprecipitation. With the intention of controlling the filtration pressure and handling facility, dilution with an appropriate solvent is preferably performed prior to filtration.

(Reprecipitation)

The thus obtained cellulose acylate solution is mixed in a poor solvent, such as water or a water solution of carboxylic acid (e.g., acetic acid or propionic acid), or such a poor solvent is mixed in the cellulose acylate solution, resulting in reprecipitation of cellulose acylate. The intended cellulose acylate can be obtained by further subjecting the cellulose acylate reprecipitated to washing and stabilization processing. The reprecipitation may be carried out by one continuous operation or intermittently in small batches. In addition, it is also preferable that configuration and molecular weight distribution of the reprecipitated cellulose acylate are controlled by adjusting the concentration of the cellulose acylate solution and the composition of poor solvent in response to the substitution pattern or polymerization degree of the cellulose acylate.

For the purpose of further enhancing purification effect and adjusting the molecular weight distribution and the apparent density, the cellulose acylate once reprecipitated may be subjected to additional reprecipitation, which includes dissolution of reprecipitates in a good solvent (e.g., acetic acid or acetone) and subsequent action of a poor solvent (e.g., water) thereon, once more or over several times, if desired.

(Washing)

The cellulose acylate produced is preferably subjected to wash processing. The wash solvent used in wash processing, though may be any solvent as far as it hardly dissolves cellulose acylate and can ensure elimination of impurities, is generally water or hot water. The temperature of wash solvent (wash water) is preferably from 25° C. to 100° C., far preferably from 30° C. to 90° C., particularly preferably from 40° C. to 80° C. The wash processing may be performed by a recurrence of filtration and wash water change, or the so-called batchwise operation, or by use of a continuous washing apparatus. In addition, it is also preferable that waste solutions produced in reprecipitation and wash processing are recycled as a poor solvent for reprecipitation processing or the solvent such as a carboxylic acid is recovered by distillation or the like and reused.

The progress of washing may be tracked by any method, but it is advantageous to adopt measurements of hydrogen ion concentration, ion chromatography, conductimetry, ICP, elemental analysis or atomic absorption spectroscopy.

By such a procedure, a catalyst used (such as sulfuric acid, perchloric acid, trifluoroacetic acid, p-toluenesulfonic acid, methanesulfonic acid or zinc chloride), a neutralization agent used (such as calcium, magnesium, iron, aluminum or zinc carbonate, acetate, hydroxide or oxide), products of reaction between the neutralization agent and the catalyst, carboxylic acids used (e.g., acetic acid, propionic acid, butyric acid), and products of reaction between the neutralization agent and the carboxylic acids can be eliminated from the acylation product of cellulose. In this respect, the procedure mentioned above is effective in enhancing stability of the cellulose acylate produced.

(Stabilization)

It is also preferable that the acylation product of cellulose after washing by hot water processing is reduced in residual impurities by processing with a water solution of weak alkali (such as sodium, potassium, calcium, magnesium or aluminum carbonate, hydrogen carbonate, hydroxide or oxide) for the purpose of further enhancing the stability and lessening the smell of carboxylic acids.

The amount of residual impurities can be controlled by the amount of a wash solution used, the temperature and time of washing, the form of a washing vessel, and the composition and concentration of a stabilizer used. In the invention, it is appropriate that the setting of conditions for acylation, partial hydrolysis and washing be made so as to adjust the amount of residual sulfate radical to 0 to 500 ppm.

(Drying)

For adjusting the moisture content in cellulose acylate used in the invention to an appropriate value, it is favorable that the acylation product of cellulose is dried. The drying has no particular restriction as to its method so far as the method can achieve the intended moisture content, but it can be effectively performed by means of a heater, an air blower and a stirrer singly or in combination. The drying temperature is preferably from 0° C. to 200° C., far preferably from 40° C. to 180° C., particularly preferably from 50° C. to 160° C. The moisture content in the cellulose acylate used in the invention is preferably 2 mass % or below, far preferably 1 mass % or below, particularly preferably 0.7 mass % or below.

(Form)

A cellulose acylate used in the invention can have various forms including grainy, powdery, fibrous and massive forms. However, when used as a raw material for film production, the cellulose acylate preferably has a grainy or powdery form. Therefore, the acylation product after drying may be ground or put through a sieve with the intention of improving the uniformity of grain sizes and handling facility. When the cellulose acylate has a grainy form, it is preferable that 90 mass % or more of the grains used have their grain sizes in the range of 0.5 to 5 mm. In addition, it is preferable that at least 50 mass % of the grains used have their grain sizes in the range of 1 to 4 mm.

It is advantageous that the cellulose acylate grains in the invention have a form as close to a sphere as possible. And the apparent density of the cellulose acylate grains is preferably from 0.5 to 1.3, far preferably from 0.7 to 1.2, particularly preferably from 0.8 to 1.15. The method for measurements of apparent density is defined in JIS K-7365.

The rest angle of the cellulose acylate grains used in the invention is preferably from 10 to 70 degrees, far preferably from 15 to 60 degrees, particularly preferably from 20 to 50 degrees.

(Polymerization Degree)

A cellulose acylate suitable for use in the invention has an average polymerization degree ranging preferably from 150 to 700, far preferably from 180 to 550, very far preferably from 200 to 400, particularly preferably from 200 to 350. The average polymerization degree can be determined by a method of molecular weight distribution measurement utilizing gel permeation chromatography (GPC) as described in a limit viscosity method of Uda et al. (Kazuo Uda and Hideo Saito, *Bulletin of The Society of fiber Science and Technology Japan*, Vol. 18, No. 1, pp. 105-120 (1962)). In addition, methods for determination of average polymerization degree are described in detail in JP-A-9-95538.

The cellulose acylate used in the invention has its ratio of mass-average polymerization degree to number-average polymerization degree, which are evaluated by GPC, in the range of preferably 1.6 to 3.6, fir preferably 1.7 t 3.3, particularly preferably 1.8 to 3.2.

(Fine Extraneous Particles in Acylation Product of Cellulose)

Fine extraneous particles in the acylation product of cellulose are originated from an unreacted cellulose fiber. These fine extraneous paritcles remaining in an optical film is viewed as bright spots when the optical film is sandwiched between two polarizing plates in a crossed Nicol arrangement. These bright spots become a cause of light leakage in liquid crystal display. Therefore, it is appropriate to minimize the content of fine extraneous particles in the acylation product of cellulose. Specifically, the number of fine extraneous particles can be estimated as follows.

An about 10 mg of cellulose acylate sample is sandwiched between two glass slides measuring 1 cm$^2$ in size and 150 μm in thickness, and molten into a transparent cellulose acylate film about 50 μm in thickness. The thickness of the thin cellulose acylate film thus formed may be determined by subtracting the thicknesses of two original glass slides from the thickness of a laminate formed of the cellulose acylate film and the two glass slides. When the film thickness differs considerably from 50 μm, error conversion may be carried out later. An arbitrarily chosen 1 mm region of the thin cellulose acylate film sandwiched between the glass slides is observed under an microscope, and the number of fine extraneous particles present in a volume of 1 mm$^2$×50 μm=5×10$^{-2}$ mm$^3$ (hereinafter taken as a unit volume) is counted. The number of fine extraneous particles 10 μm or shorter in length (sometines referred to as "extraneous polarizing particulates") is preferably 5 or below, far preferably 4 or below, very far preferably 3 or below, particularly preferably 0, per unit volume. Although it may occur that fine extraneous particles longer than 10 μm in length are contained, the number of such particles is roughly proportional to the number of fine extraneous particles 10 μm or below, so the fine extraneous particles 10 μm or below can be used as the reference in the invention.

(Sulfur Residue in Acylation Product of Cellulose)

When sulfuric acid is used as catalyst in the preparation method of cellulose acylate, it occurs occasionally that sulfate remains in the final acylation product of cellulose. The thermal stability of cellulose acylate is sometimes influenced by such remaining sulfate. Therefore, the sulfur residue content in the cellulose acylate for use in the invention is preferably from 0 to 100 ppm, far preferably from 10 to 80 ppm, especially preferably from 10 to 60 ppm, on a sulfur-atom basis.

(Melting Point of Cellulose Acylate)

The cellulose acylate for use in the invention is required to have a melting point suitable for practical use because melt film formation is applied thereto. When the melting point of cellulose acylate is too high, the cellulose acylate is beginning to decompose before it is molten; while, when it has a too low melting point, the cellulose acylate cannot be used as a practicable optical film. Therefore, the melting point of cellulose acylate for use in the invention is preferably from 160° C. to 260° C., far preferably from 170° C. to 260° C., particularly preferably from 170° C. to 250° C.

The suitable Mw/Mn ratio of cellulose acylate for use in the invention (wherein Mw stands for a mass-average molecular weight and Mn stands for a number-average molecular weight) is from 1.5 to 5.5, preferably from 2.0 to 5.0, far preferably from 2.5 to 5.0, particularly preferably from 3.0 to 5.0.

These various kinds of cellulose acylate may be used singly or as mixtures of two or more kinds, or high polymers other than cellulose acylate may be appropriately mixed therewith. The high polymers mixed are preferably those having excellent compatibility with the cellulose ester. It is advantageous that the cellulose acylate for use in the invention have a transmittance of 90% or above, preferably 91% or above, particularly preferably 92% or above, when formed into a film.

(Development of Optical Anisotropy in Cellulose Acylate)

A method of developing optical anisotropy by stretching cellulose acylate is preferred.

Retardations of cellulose acylate film can be adjusted by stretch processing.

It is appropriate that the cellulose acylate film be stretched to 1.1 to 4 times, preferably 1.2 to 3 times, its original length or width. It is also possible to combine the film stretching in the direction of length with the stretching in the direction of width (tenter).

As to the stretching method, existing methods can be adopted so long as they don't cause any deviation from the scope of claims of the invention. From the viewpoint of in-plane uniformity, however, the use of tenter stretching in particular is preferred. The cellulose acylate film for use in the invention is preferably at least 100 cm in width, and variations in Re values along its entire width are preferably ±5 nm, far preferably ±3 nm. In addition, variations in Rth values along the entire width of the film are preferably ±10 nm, far preferably ±5 nm. Further, it is preferable that variations in Re values and those in Rth values in the direction of length are also within the ranges of those in the direction of width.

The stretch processing may be performed during the film formation process, or an original roll made by winding a film formed may be subjected to stretch processing. In the former case, the stretch may be carried out in a condition that the solvent is contained in a residual amount, and the content of the solvent remaining at the start time of stretching is preferably from 2 to 50%. The expression "the content of the solvent remaining at the start time of stretching" refers, for the case of tenter stretching, to the content of the solvent remaining at the start time of a grasp of both sides of web (half-dry dope) with clips, and it is preferred by far to start the stretching when the content of the solvent remaining is from 5 to 50%, particularly from 10 to 45%. Additionally, the content of the solvent remaining is calculated by the following equation:

(Content of solvent remaining)=100×{(Amount of solvent in web)/(Total amount of web)}

Further, it is preferable in the above case that the stretching is performed in the direction orthogonal to the direction of the length as a long length of film is fed in the direction of the length and thereby the slow axis and the long-length direction of the film are made to cross each other at right angles.

The stretching temperature can be chosen appropriately according to the conditions determined by the content of the solvent remaining and the film thickness at the time of stretching.

When the stretching is carried out in a condition that some solvent remains in a film to be stretched, it is appropriate that the film be dried after the stretching. The drying can be performed according to the methods offered in the foregoing film formation descriptions.

The thickness of the film after stretching is 110 μm or below, preferably from 40 to 110 μM, far preferably from 60 to 110 μm, particularly preferably from 80 to 110 μm.

The stretching after drying is carried out at a temperature ranging preferably from a cellulose acylate's Tg to the Tg plus 50° C., far preferably from a cellulose acylate's Tg to the Tg plus 30° C., particularly preferably from a cellulose acylate's Tg to the Tg plus 20° C. The suitable stretch magnification is from 10% to 300%, preferably from 15% to 200%, particularly preferably from 20% to 150%, in at least one direction. Such stretching may be performed in single-step or a multiple-step operation.

(Additives to Cellulose Acylate)

As additives for elevating the optical anisotropy, compounds represented by the following formula (1) can be added in the invention, if needed.

(Retardation Elevating Agent)

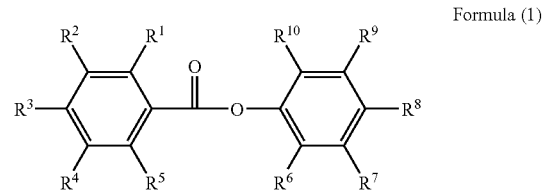

Formula (1)

In the above formula, $R^1$, $R^2$, $R^3$, $R^4$, $R^6$, $R^7$, $R^9$ and $R^{10}$ each represent a hydrogen atom or a substituent independently, provided that at least one among the substituents represented by $R^1$, $R^2$, $R^3$, $R^4$ and $R^5$ is an electron-donating group. $R^8$ represents a hydrogen atom, a 1-4C alkyl group, a 2-6C alkynyl group, a 6-12C aryl group, a 1-12C alkoxy group, a 6-12C aryloxy group, a 2-12C alkoxycarbonyl group, a 2-12C acylamino group, a cyano group or a halogen atom.

As mentioned above, $R^1$, $R^2$, $R^3$, $R^4$, $R^5$, $R^6$, $R^7$, $R^9$ and $R^{10}$ each represent a hydrogen atom or a substituent independently, and to the substituent is applicable Substituent T described hereinafter.

At least one among the substituents represented by $R^1$, $R^2$, $R^3$, $R^4$ and $R^5$ represents an electron-donating group. It is preferable that one among the substituents $R^1$, $R^3$ and $R^5$ is an electron-donating group, and it is preferable by far that $R^3$ is an electron-donating group.

The term "electron-donating group" as used herein is intended to include groups having Hammet's $\sigma_p$ values of 0 or below, to which the groups described as those having Hammet's $\sigma_p$ values of 0 or below in Chem. Rev., 91, 165(1991) can be applied suitably. Among them, the groups having Hammet's $\sigma_p$ values from −0.85 to 0 are preferably used. Examples of such groups include an alkyl group, an alkoxy group, an amino group and a hydroxyl group.

Of these groups, an alkyl group and an alkoxy group are preferable to the others, and the most suitable group is an alkoxy group (having preferably 1 to 12 carbon atoms, far preferably 1 to 8 carbon atoms, further preferably 1 to 6 carbon atoms, particularly preferably 1 to 4 carbon atoms).

$R^1$ is preferably a hydrogen atom or an electron-donating group, far preferably an alkyl group, an alkoxy group, an amino group or a hydroxyl group, further preferably a 1-4C alkyl group or a 1-12C alkoxy group, particularly preferably an alkoxy group (having preferably 1 to 12 carbon atoms, far preferably 1 to 8 carbon atoms, further preferably 1 to 6 carbon atoms, particularly preferably 1 to 4 carbon atoms). Among them, a methoxy group is most suitable as $R^1$.

$R^2$ is preferably a hydrogen atom, an alkyl group, an alkoxy group, an amino group or a hydroxyl group, far preferably a hydrogen atom, an alkyl group or an alkoxy group, further preferably a hydrogen atom, an alkyl group (having preferably 1 to 4 carbon atoms, especially a methyl group) or an alkoxy group (having preferably 1 to 12 carbon atoms, far preferably 1 to 8 carbon atoms, further preferably 1 to 6 carbon atoms, particularly preferably 1 to 4 carbon atoms). And a hydrogen atom, a methyl group or a methoxy group in particular is suitable as $R^2$.

$R^3$ is preferably a hydrogen atom or an electron-donating group, far preferably a hydrogen atom, an alkyl group, an alkoxy group, an amino group or a hydroxyl group, further preferably an alkyl group or an alkoxy group, especially preferably an alkoxy group (having preferably 1 to 12 carbon atoms, far preferably 1 to 8 carbon atoms, further preferably 1 to 6 carbon atoms, particularly preferably 1 to 4 carbon atoms). Among them, an n-propoxy group, an ethoxy group or a methoxy group is most suitable as $R^3$.

$R^4$ is preferably a hydrogen atom or an electron-donating group, far preferably a hydrogen atom, an alkyl group, an alkoxy group, an amino group or a hydroxyl group, further preferably a hydrogen atom, an alkyl group having 1 to 4 carbon atoms or an alkoxy group having 1 to 12 carbon atoms (having preferably 1 to 12 carbon atoms, far preferably 1 to 8 carbon atoms, further preferably 1 to 6 carbon atoms, particularly preferably 1 to 4 carbon atoms), especially preferably a hydrogen atom, a 1-4C alkyl group or a 1-4C alkoxy group. Among them, a hydrogen atom, a methyl group or a methoxy group is most suitable as $R^4$.

$R^5$ is preferably a hydrogen atom, an alkyl group, an alkoxy group, an amino group or a hydroxyl group, far preferably a hydrogen atom, an alkyl group or an alkoxy group, further preferably a hydrogen atom, an alkyl group (preferably having 1 to 4 carbon atoms, especially a methyl group) or an alkoxy group (having preferably 1 to 12 carbon atoms, far preferably 1 to 8 carbon atoms, further preferably 1 to 6 carbon atoms, especially preferably 1 to 4 carbon atoms). Among them, a hydrogen atom, a methyl group or a methoxy group in particular is suitable as $R^5$.

Each of $R^6$, $R^7$, $R^9$ and $R^{10}$ is preferably a hydrogen atom, a 1-12C alkyl group, a 1-12C alkoxy group or a halogen atom, far preferably a hydrogen atom or a halogen atom (such as a chlorine, bromine or iodine atom), especially preferably a hydrogen atom.

$R^8$ is preferably a 1-4C alkyl group, a 2-6C alkynyl group, a 6-12C aryl group, a 1-12C alkoxy group or a 6-12C aryloxy group, far preferably a 6-12C aryl group, a 1-12C alkoxy group or a 6-12C aryloxy group, further preferably a 1-12C alkoxy group (far preferably a 1-8C alkoxy group, further preferably a 1-6C alkoxy group, especially preferably a 1-4C alkoxy group), particularly preferably a methoxy group, an ethoxy group, an n-propoxy group, an iso-propoxy group or an n-butoxy group.

The compounds represented by formula (1) are illustrated below in detail by giving specific examples thereof, but the invention should not be construed as being limited to these examples in any way.

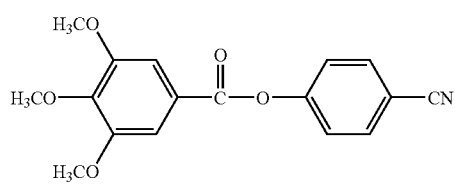

A-1

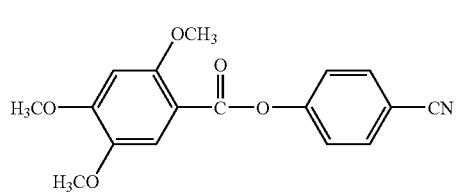

A-2

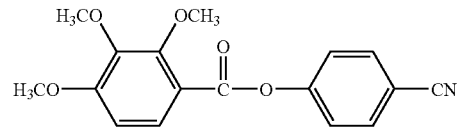

A-3

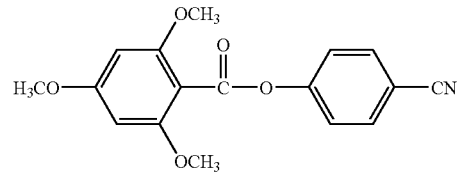

A-4

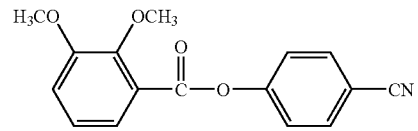

A-5

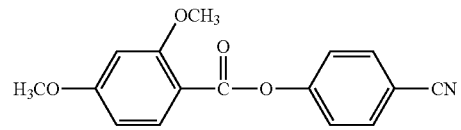

A-6

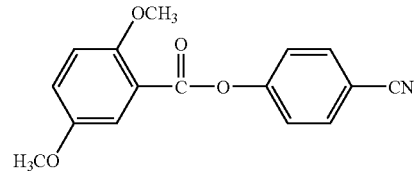

A-7

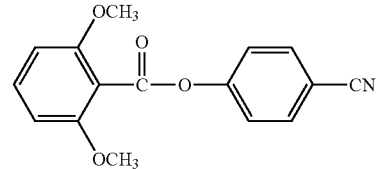

A-8

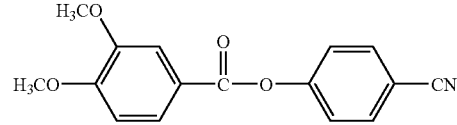

A-9

-continued
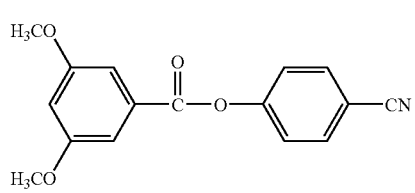 A-10
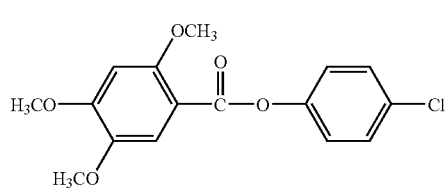 A-11
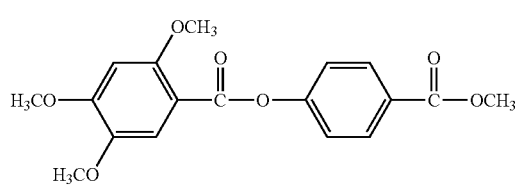 A-12
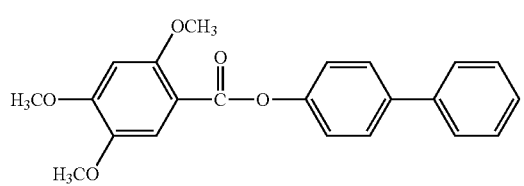 A-13
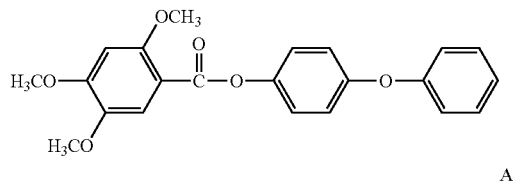 A-14
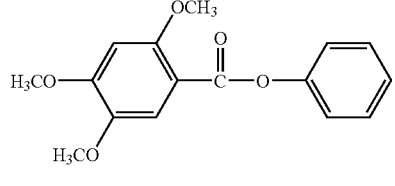 A-15
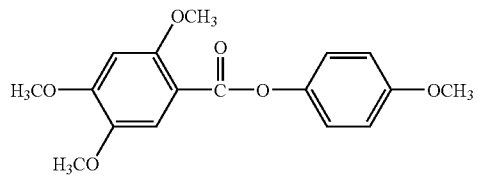 A-16
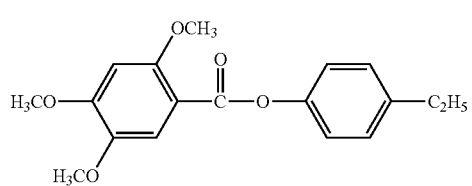 A-17
-continued
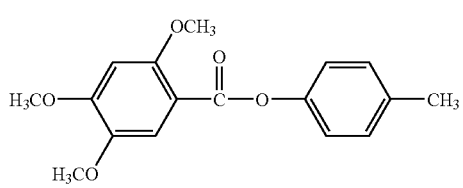 A-18
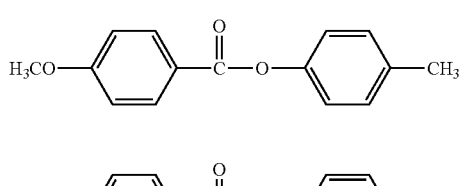 A-19
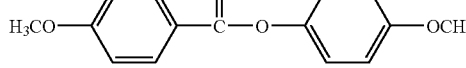 A-20
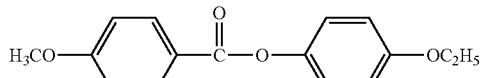 A-21
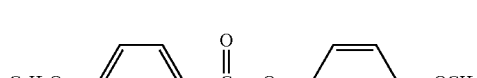 A-22
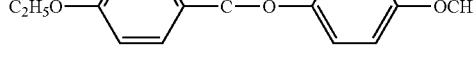 A-23
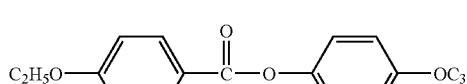 A-24
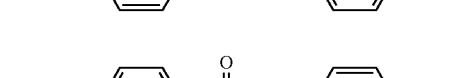 A-25
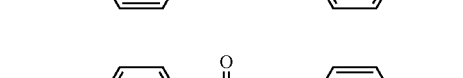 A-26
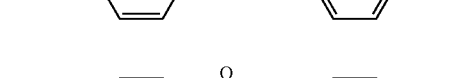 A-27
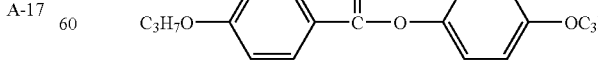 A-28
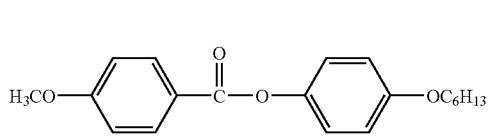 A-29

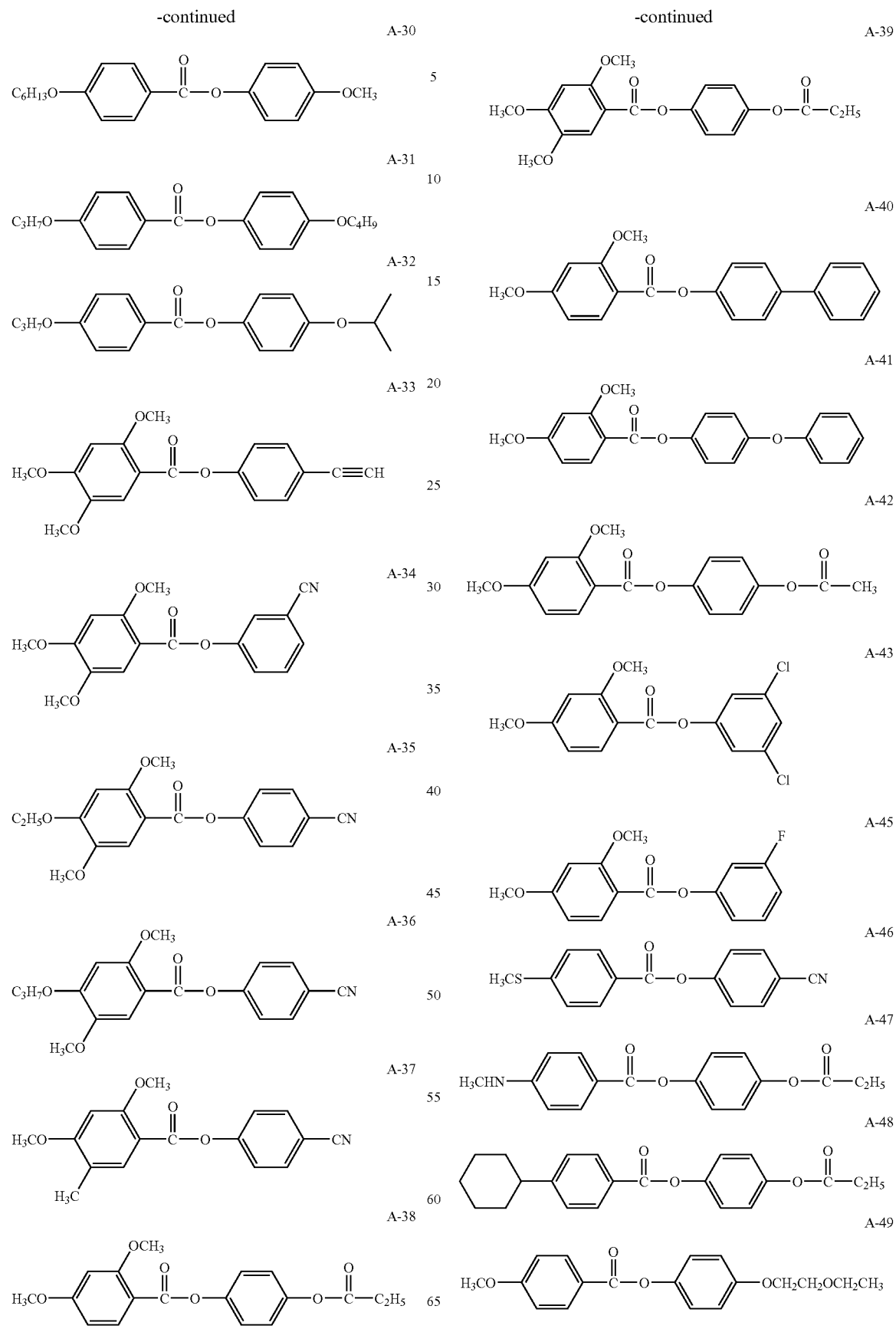

-continued

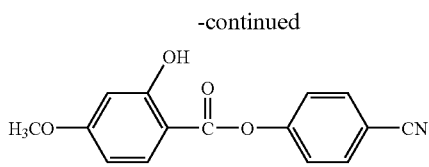
A-50

The compounds represented by formula (1) can be synthesized by general esterification as reaction between substituted benzoic acids and phenol derivatives, and thereto any reaction method may be applied as far as it ensures formation of ester linkage. For instance, the reaction method applicable therein is a method of carrying out functional-group conversion from substituted benzoic acids into the corresponding acid halides and then causing condensation reaction between the acid halides and phenols, or a method of causing dehydration condensation between substituted benzoic acids and phenol derivatives in the presence of a condensing agent or a catalyst.

In view of the production process, the method of carrying out functional-group conversion from substituted benzoic acids into the corresponding acid halides and then causing condensation reaction between the acid halides and phenols is preferred.

The compounds represented by formula (1) are each used in an amount ranging from 0.01 to 20 parts by mass per 100 parts by mass of cellulose acylate. And the amount of each compound used is preferably from 0.05 to 15 parts by mass, especially 0.1 to 10 parts by mass, per 100 parts by weight of cellulose acylate. The compounds represented by formula (1) may be used as combinations of two or more thereof.

In addition to the retardation elevating agents mentioned above, known plasticizers, oxidative degradation inhibitors and matting agents can be added to the cellulose acylate.

As a plasticizer for improvement of mechanical properties and speedup in dry processing, a phosphoric acid ester or a carboxylic acid ester can be used. Examples of a phosphoric acid ester include triphenyl phosphate (TPP), biphenyldiphenyl phosphate (BDP) and tricresyl phosphate (TCP).

Representative examples of a carboxylic acid ester are a phthalic acid ester and a citric acid ester. Examples of a phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of a citric acid ester include triethyl O-acetylcitrate (OACTE) and tributyl O-acetylcitrate (OACTB). Examples of other carboxylic acid esters include butyl oleate, methylacetyl ricinoleate, dibutyl sebacate and various trimellitic acid esters. Of these plasticizers, the phthalate plasticizers (DMP, DEP, DBP, DOP, DPP, DEHP) are preferred over the others. And DEP and DPP in particular are used to advantage.

The amount of plasticizers added is preferably from 0.1 to 25 mass %, far preferably from 1 to 20 mass %, especially preferably from 3 to 15 mass %, based on the cellulose acylate.

In order to prevent the cellulose acylate from degrading by thermal oxidation, it is appropriate that an oxidative degradation inhibitor be added. For instance, a synergistic effect on prevention of degradation can be obtained by adding a phenol compound in combination with a thioether compound or a phosphorus-containing compound as required. As to details of other oxidative degradation inhibitors, the materials described in *Journal of Technical Disclosure*, No. 2001-1745, pp. 17-22 (Mar. 15, 2001), issued by the JIII, can be used to advantage.

(Fine-Grained Matting Agent)

It is preferable that fine grains as a matting agent are added to a cellulose acylate film for use in the invention. Examples of a fine-grained material usable in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Of these fine-grained materials, the silicon-containing materials are preferred over the others from the viewpoint of low turbidity, and silicon dioxide in particular is used to advantage. As to the fine grains of silicon dioxide, the suitable average primary-grain size is 20 nm or below and the suitable apparent density is 70 g/little or above. The fine-grained silicon dioxide having a small average primary-grain size of 5 to 16 nm is preferable by far because the haze of the resulting film can be reduced. The apparent density of the fine grains is preferably of the order of 90 to 200 g/little, far preferably of the order of 100 to 200 g/little. The greater apparent density the fine grains have, the higher concentration the dispersion thereof can have, and the more favorable they are for improvements in haze and aggregates.

In general these fine grains form secondary grains having an average grain diameter of 0.1 to 3.0 pun and, in the film, they are present as an aggregate of primary grains. Therefore, microscopic asperities in the 0.1 to 3.0 μm size can be formed on the film surface. The average secondary-grain size of the fine grains is preferably from 0.2 μm to 1.5 μm, far preferably from 0.4 μm to 1.2 μm, particularly preferably from 0.6 μm to 1.2 μm. As to the primary-grain and secondary-grain sizes of the fine grains, grains in the film are observed under a scanning electron microscope, and the diameters of circles circumscribing the grains are defined as the grain sizes. And 200 grains present in varying locations are observed, and the average value of their diameters is taken as the average grain size.

As fine grains of silicon dioxide can be used commercially available silicon dioxide, such as Aerosil R972, R972V, R974, R812, 200, 200V, 300, R202, OX50 and TT600 (trade names, produced by Nippon Aerosil Co., Ltd.). Fine grains of zirconium oxide are commercially available in trade names, e.g., Aerosil R976 and R811 (products of Nippon Aerosil Co., Ltd.), and can be used suitably in the invention.

Of those products, Aerosil 200V and Aerosil R972 are fine-grained silicon dioxide products 200 nm or below in their average primary-grain sizes and 70 g/litter or above in their apparent densities, and they are especially preferred because of their great effect on reduction of the friction coefficient while maintaining the turbidity of optical film at a low value.

(Formation of Cellulose Acylate Film)

It is preferable that a cellulose acylate film is formed using a solvent casting method or a melt casting method.

(Solvent Casting Method)

In a solvent casting method, a film is formed by use of a solution containing cellulose acylate in a state of being dissolvent in an organic solvent (a dope).

It is preferable that the organic solvent contains a solvent selected from 3-12C ethers, 3-12C ketones, 3-12C esters or 1-6C halogenated hydrocarbons.

These ethers, ketones and esters may have cyclic structures. A compound containing two or more of the functional groups constituting ether, ketone and ester (namely, —O—, —CO— and —COO— groups) may also be used as the organic solvent. In addition to those functional groups, the organic solvent used may have other functional groups including an alcoholic hydroxyl group. In the case of using the organic solvent with two or more kinds of functional groups, the number of carbons contained therein may be within the specified range of a compound having any of those functional groups.

Examples of 3-12C ethers include diisopropyl ether, dimethoxymethane, dimethoxyethane, 1,4-dioxane, 1,3-dioxolan, tetrahydrofuran, anisole and phenetole.

Examples of 3-12C ketones include acetone, methyl ethyl ketone, diethyl ketone, disobutyl ketone, cyclohexanone and methylcyclohexanone.

Examples of 3-12C esters include ethyl formate, propyl formate, pentyl formate, methyl acetate, ethyl acetate and pentyl aceate.

Examples of an organic solvent having two or more functional groups include 2-ethoxyethyl acetate, 2-methoxyethanol and 2-butoxyethanol.

The number of carbon atoms in a halogenated hydrocarbon is preferably 1 or 2, especially 1. The halogen in the halogenated hydrocarbon is preferably chlorine. In a halogenated hydrocarbon, the proportion of halogen substituted for hydrogen atoms of the corresponding hydrocarbon is preferably from 25 to 75 mole %, far preferably from 30 to 70 mole %, further preferably from 35 to 65 mole %, especially preferably from 40 to 60 mole %. One of the representatives of halogenated hydrocarbons is methylene chloride.

Two or more of the organic solvents as recited above may be used as a mixture.

A cellulose acylate solution can be prepared in a usual manner. The expression "in a usual manner" means that the preparation processing is carried out at a temperature of 0° C. or higher (e.g., room temperature or a high temperature). The preparation of the solution can be performed using a procedure and apparatus for dope preparation in a usual solvent casting method. In such a usual manner, it is preferable that a halogenated hydrocarbon (especially methylene chloride) is used as the organic solvent.

The amount of cellulose acylate used is adjusted so that the cellulose acylate concentration in a solution obtained is in the range of 10 to 40 mass %, preferably 10 to 30 mass %. In the organic solvent (main solvent), any of the additives described hereinafter may be added in advance.

The solution can be prepared by stirring cellulose acylate into an organic solvent at room temperature (from 0 to 40° C.). In preparing a high concentration of solution, the stirring may be carried out under a condition of being pressurized and heated. Specifically, cellulose acylate and a solvent are placed and sealed in a pressure container, and stirred as they are pressurized and heated to a temperature higher than the boiling point of the solvent at room temperature and lower than the temperature at which the solvent boils under the applied pressure. The heating temperature is usually 40° C. or higher, preferably from 60° C. to 200° C., far preferably from 80° C. to 110C.

From the cellulose acylate solution (dope) thus prepared, a cellulose acylate film is formed in accordance with a solvent casting method.

A dope is flow-cast onto a drum or a band, and the solvent is vaporized to form a film. Prior to the flow casting, it is preferable that the solids concentration in the dope is adjusted to the 18-35% range. And it is also preferable that the drum or band used has a mirror-finished surface. As to the flow-casting and drying processes in a solvent casting method, descriptions thereof can be found in U.S. Pat. Nos. 2,336,310, 2,367,603, 2,492,078, 2,492,977, 2,492,978, 2,607,704, 2,739,069 and 2,739,070, British Patent Nos. 640,731 and 736,892, JP-B-45-4554, JP-B-49-5614, JP-A-60-176834, JP-A-60-203430 and JP-A-62-115035.

The dope is preferably flow-cast onto a drum or a band the surface temperature of which is adjusted to 10° C. or below. After the flow casting, it is preferable that the dope is dried for at least 2 seconds by airing. The film thus formed is peeled away from the drum or the band, and further it can be dried by hot air while changing a hot air temperature stepwise from 100° C. to 160° C., thereby evaporating the residual solvent. Descriptions of such a process can be found in JP-B-5-17844. According to such a process, the time elapsed between the dope flow casting and the peeling of film formed can be reduced. In order to perform that process, the dope is required to cause gelation at the surface temperature of the drum or the band under flow casting.

(Melt Casting Method)

A cellulose acylate film for use in the invention can be formed by application of a melt casting method to the cellulose acylate. The process for melt film formation is described below in detail.

(Pelletization)

In the melt film formation from cellulose acylate, it is more advantageous for the cellulose acylate to be in a pellet form than in a powder form. Formation of pellets is carried out as follows.

To begin with, the cellulose acylate undergoes pre-drying to a sufficient degree (for 0.1 to 24 hours at a temperature ranging from 80° C. to 150° C.). Then, thoroughly dried additives as mentioned above (such as a retardation elevating agent (including the compounds represented by formula (1) in the invention), a plasticizer, a degradation inhibitor, a UV degradation inhibitor, a matting agent, a wavelength dispersion adjusting agent, an infrared absorbent and a surfactant) are added to the cellulose acylate in amounts required respectively.

And subsequently the mixture obtained is charged into a hopper with a stirrer. Herein, it is preferable that the hopper is filled with an inert gas such as nitrogen by atmosphere displacement. After the charging, pellets are formed using a biaxial knead-extruder at a temperature ranging from 150° C. to 240° C., preferably from 160° C. to 240° C., far preferably from 170° C. to 235° C., at a screws' rotational speed of 100 rpm to 800 rpm, preferably 150 rpm to 600 rpm, far preferably 200 rpm to 400 rpm, for a residence time of 5 seconds to 3 minutes, preferably 10 seconds to 2 minutes, far preferably 20 seconds to 90 seconds.

For the purpose of degradation control, as mentioned above, it is appropriate that the pellet formation be performed in an inert gas atmosphere. The inert gas favorably used herein is nitrogen. The suitable purity of nitrogen gas is at least 95%, preferably 99% or above, particularly preferably 99.5% or above.

It is advantageous that a vent is installed on the exit side of the biaxial knead-extruder and the pellet formation is performed while evacuating the extruder under vacuum. This is because the cellulose acetate powder is hydrophilic and has a residual moisture content of about 0.2 mass %; as a result, decomposition of low-acetylated cellulose is promoted in the presence of water and thereby extraneous cross-linked substances are liable to be made. The degree of vacuum in the vent part is preferably from 0.9 to 0.001 atmosphere, far preferably from 0.8 to 0.01 atmosphere, especially preferably from 0.7 to 0.1 atmosphere. Such evacuation of the extruder under vacuum can be achieved by fixing a vent to a screw casing of the biaxial knead-extruder and installing piping from the vent to a vacuum pump. After melting, the cellulose acylate is solidified into the form of strands in hot water the temperature of which is in the range of 30° C. to 90° C., preferably 35° C. to 80° C., far preferably at least 37° C. to 60° C., cut and dried.

The sizes of cellulose acylate pellets are preferably from 1 mm³ to 10 cm³, far preferably from 5 mm³ to 5 cm³, further preferably from 10 mm³ to 3 cm³. Herein, it is preferable to pelletize the cellulose acylate together with the additives as mentioned above. Thereafter, the pellets formed is preferably dried so that the moisture contents therein is reduced to 0.1% or below.

(Melt Extrusion)

In the next place, the pelletized cellulose acylate, a compound represented by formula (1) (retardation elevating agent) and other additives as required (e.g., a plasticizer, a degradation inhibitor, a UV degradation inhibitor, a matting agent, a wavelength dispersion adjusting agent, an infrared absorbent) are charged into the hopper of a melt extruder. In the foregoing cases where additives are added at the synthesis stage of cellulose acylate and in the pelletizing process, any additives needn't be added in the process of melt film formation. The temperature of hopper is adjusted to the range of the temperature lower than a Tg of cellulose acylate used by 50° C. to the temperature higher than the Tg by 30° C. (hereinafter described as the range of Tg-50° C. to Tg+30° C., ditto for other temperature ranges), preferably the range of Tg-40° C. to Tg+10° C., far preferably the range of Tg-30° C. to Tg. By doing so, re-adsorption of moisture inside the hopper can be controlled, and the efficiency of the dry processing as mentioned above can easily be developed.

In the concrete, the melt viscosity of cellulose acylate can be lowered by addition of a compound represented by formula (1) and other additives including a plasticizer and an antioxidant to cellulose acylate resin. Further, it is preferable in the invention that the screw of a uniaxial or biaxial extruder used at the time of melt film formation rotates at a high speed and the screw has such a temperature pattern that the screw temperature is raised stepwise from a feed part (hopper side) on the upstream side to the downstream metering part (T-die side) via a compression part (intermediate part). More specifically, the screw temperature is controlled in each individual part, and the temperatures from the upstream feed part to the downstream metering part (T-die side) are raised stepwise, and thereby the melting of unmolten extraneous particulates can be promoted, and a minimum thermal hysteresis required for melting can be controlled to result in reduction of thermal degradation and yellowish coloration of the resin.

As to the screw temperature pattern in the invention, it is appropriate that the temperatures from the upstream feed part to the downstream metering part be set so as to rise in each step by 5° C. to 50° C., preferably by 5° C. to 30° C., particularly preferably by 1° C. to 20° C.

The suitable temperature in the upstream feed part is from 150° C. to 190° C., preferably from 160° C. to 190° C., far preferably from 170° C. to 190° C., and the suitable temperature in the intermediate compression part is from 170° C. to 210° C., preferably from 180° C. to 210° C., far preferably from 190° C. to 210° C. The suitable temperature in the dowmstream metering part is from 190° C. to 240° C., preferably from 200° C. to 240° C., far preferably from 21° C. to 240° C.

The number of revolutions of the screw of a melt extruder used in the invention is preferably from 60 rpm to 400 rpm, far preferably from 70 rpm to 350 rpm, further preferably from 80 rpm to 300 rpm. The residence time in the extruder is set at preferably from 5 seconds to 8 minutes, far preferably from 10 seconds to 7 minutes, further preferably from 30 seconds to 6 minutes, and then the cellulose acylate is extruded in a molten state. It is also preferable that the melt extrusion is carried out while feeding a stream of inert gas (e.g., nitrogen) into the melt extruder. The inert gas used herein is preferably nitrogen. The suitable purity of nitrogen gas is at least 95%, preferably 99% or above, particularly preferably 99.5% or above.

Further, when the screw compression ratio in the melt extrusion stage applied in the invention is too small, sufficient kneading is not performed and melting in areas remaining undissolved becomes insufficient, thereby causing a problem of developing extraneous polarizing particulates. On the other hand, when the compression ratio is too great, the heat evolved causes thermal degradation in the resin and there arises a problem of intensifying a yellowish hue of the film formed by melting. In addition, when the L/D ratio (the length/diameter ratio of the screw) is small, the extent of kneading becomes insufficient and the same problem as in the case of small compression ratios comes up; while, when the L/D ratio is too great, the residence time becomes too long, the resin tends to suffer degradation. Therefore, the compression ratio of the screw is preferably from 2.5 to 4.5, far preferably from 2.8 to 4.2, further preferably from 3 to 4. And the L/D ratio is preferably from 20 to 50, far preferably from 22 to 45, further preferably from 24 to 40.

(Filtration)

Then, the molten cellulose acylate (hereinafter referred to as "cellulose acylate melt" or "melt" in some cases) is passed through a gear pump, thereby removing ripples arising from the extruder, and subjected to filtration using a metal mesh filter or leaf disc of sintered metal. The mesh size is preferably from 2 to 30 μm, far preferably from 2 to 20 μm, further preferably from 2 to 10 μm. During the filtration, it is preferable to apply pressure, and thereby to make the time required for the filtration as short as possible. The filtration pressure is preferably from 0.5 MPa to 15 MPa, far preferably from 2 MPa to 15 MPa, especially preferably from 10 MPa to 15 MPa. The higher filtration pressure is preferable, because the more the filtration time can be saved. And it is appropriate to apply high pressure on such a level as not to cause breakage of the filter.

The temperature during the filtration is preferably from 180° C. to 230° C., far preferably from 180° C. to 220° C., further preferably from 190° C. to 220° C. This is because the problem of promoting the progress of thermal degradation and the like is hard to occur as far as the temperature during the filtration is lower than the upper limit specified above, and besides, the temperatures higher than the lower limit are hard to cause a trouble that too much time is required for the filtration to result in the progress of thermal degradation or the like. It is appropriate that the time required for the filtration be minimized to prevent the resin from being stained yellow. The amount of one-minute filtration per cm² of filter is preferably from 0.05 cm³ to 100 cm³, far preferably from 0.1 cm³ to 100 cm³, further preferably from 0.5 cm³ to 100 cm³.

(Melt Flow Casting)

The cellulose acylate melt thus filtrated is extruded from a T die mounted back of the filter. The extrusion may be performed in the form of single layer, or multilayer extrusion may be performed by use of a multi manifold die or a feed block die. Herein, the thickness unevenness in the width direction can be controlled by adjustment of the die lip opening. Thereafter, the cellulose acylate melt is extruded onto a casting drum. At this time, it is appropriate that the adhesion of the melt-extruded sheet to the casting drum be enhanced by use of a static electricity application method, an air knife method, an air chamber method, a vacuum nozzle method or a touch roll method. These adhesion enhancement methods each may be applied to the surface of melt-extruded sheet in its entirety or in part.

It is also preferable that the extrusion of cellulose acylate melt from a die is carried out in an atmosphere of inert gas. The inert gas used herein is preferably nitrogen. The purity of nitrogen gas is preferably 95% or above, far preferably 99% or above, particularly preferably 99.5% or above.

The suitable die lip opening is 1 to 10 times, preferably 2 to 8 times, far preferably 3 to 7 times, the thickness of film to be formed. The sheet extruded on the thick side as mentioned above from the die lip is adjusted so as to have the desired thickness by controlling the circumferential velocity of the casting drum (hereinafter abbreviated to CD in some cases). The suitable temperature of the die lip is from 180° C. to 250° C., preferably from 190° C. to 240° C., far preferably from 200° C. to 230° C.

In extruding the melt onto a metal support for flow casting, which is referred to as a casting drum (CD), the surface temperature of CD is adjusted to the range of preferably Tg−50° C. to Tg+1° C., far preferably Tg−30° C. to Tg+5° C., further preferably Tg−20° C. to Tg (wherein Tg stands for a glass transition point of a mixture of the resin (cellulose acylate) with additives). The number of CDs used is preferably from 1 to 10, far preferably from 2 to 5.

After the melt is solidified on a casting drum, the solidified melt is peeled away from the drum, and then passed between nip rolls, and further wound into a roll. The winding speed is preferably from 10 m/min to 100 m/min, far preferably from 15 m/min to 80 m/min, further preferably from 20 m/min to 70 m/min.

The width of film formed from the melt is preferably from 0.5 m to 5 m, far preferably from 0.7 m to 4 m, particularly preferably from 1 m to 3 m.

After the film formation, it is preferable that the cellulose acylate film obtained is wound after the both edges thereof undergo trimming. The portions trimmed off may be reused as a feedstock for film of the same kind or different kind after they are ground into powder, or further subjected to granulation processing, or depolymerization or repolymerization treatment, if needed. Further, attachment of a lamina to at least one surface of the cellulose acylate film is also preferable from the viewpoint of avoiding scratches.

The elasticity modulus of the cellulose acylate film thus obtained is preferably from 1.5 kN/mm$^2$ to 2.9 kN/mm$^2$, far preferably from 1.7 kN/mm$^2$ to 2.8 kN/mm$^2$, further preferably from 1.8 kN/mm$^2$ to 2.6 kN/mm$^2$. The Tg of the cellulose acylate film obtained is preferably from 95° C. to 145° C., far preferably from 100° C. to 140° C., further preferably from 105° C. to 135° C.

The thickness of the film is preferably from 50 μm to 300 μm, far preferably from 70 μm to 250 μm, further preferably from 70 μm to 230 μm.

The surface haze of cellulose acylate film for use in the invention is preferably from 0.01% to 1.5%, far preferably from 0.01% to 1.2%, particularly preferably from 0.01% to 1.0%.

The transmittance of cellulose acylate film for use in the invention is preferably from 90% to lower than 100%, far preferably from 91% to lower than 100%, particularly preferably from 92% to lower than 100%.

The Re(590) of cellulose acylatae film for use in the inventionis is from 0 to 300 nm, preferably from 10 nm to 200 nm. The Rth(590) is from 10 nm to 500 nm, preferably from 30 nm to 200 nm.

In addition, it is preferable to satisfy the relation Re≦Rth.

(Optically Anisotropic Layer)

An optically anisotropic layer for use in the invention is formed with an optical anisotropy developing agent, such as a rod-shaped liquid crystalline compound, and has a Re(590) value of 5 to 150 nm, preferably 10 to 100 nm.

It is advantageous for the rod-shaped liquid crystalline compound to have a polymerizable group. When no polymerizing group is contained in the rod-shaped compound, it is preferable that the compound is fixed in a polymerizable group-containing multifunctional monomer matrix. In the case of a rod-shaped liquid crystalline compound, it is preferable that the molecules thereof are fixed to a state of being aligned in a substantially horizontal direction (homogeneously). The expression "substantially horizontal" as used herein means that the average value of angles which the major-axis directions of the molecules form with the optically anisotropic layer surface (average tilt angle) is within the range of 0° to 10°. The molecules of a rod-shaped liquid crystalline compound may be aligned obliquely. In this case also, the average tilt angle is preferably from 0° to 200.

In the case of adding an optical anisotropy developing agent (retardation elevating agent) to the cellulose acylate film, it is preferable that the tail end of light absorption wavelengths (optical absorption terminal) of a rod-shaped liquid crystalline compound is situated on the longer wavelength side than the absorption terminal of the optical anisotropy developing agent added to the cellulose acylate film. In other words, such a situation indicates that the optical absorption terminal of the optically anisotropic layer in the optical compensation sheet is situated on the longer wavelength side than the optical absorption terminal of the cellulose acylate film. Thus, it becomes possible to control the wavelength dispersion of Re.

The optical absorption terminals can be measured with a spectrophotometer.

Examples of a rod-shaped liquid crystalline compound suitably used in the invention include azomethines, azoxy compounds, cyanobiphenyls, cyanophenyl esters, benzoic acid esters, phenyl cycloyhexanecarboxylates, cyanophenyl-cyclohexanes, cyano-substituted phenylpyrimidines, alkoxy-substituted phenylpyrimidines, phenyldioxanes, tolans and alkenylcyclohexylbenzonitriles. Not only these low molecular-weight liquid crystalline molecules but also high molecular-weight liquid crystalline molecules can be used. The low molecular-weight polymerizable group-containing rod-shaped liquid crystalline compounds that can be used to particular advantage are compounds represented by the following formula (2).

$$Q^1-L^1-A^1-L^3-M-L^4A^2-L^2-Q^2 \qquad \text{Formula (2)}$$

In formula (2), $Q^1$ and $Q^2$ each represent a polymerizable group independently, $L^1$, $L^2$, $L^3$ and $L^4$ each represent a single bond or a divalent linkage group independently, $A^1$ and $A^2$ each represent a spacer group having 2 to 20 carbon atoms, and M represents a mesogenic group.

Further, the rod-shaped liquid crystalline polymerizable compounds are illustrated below.

In the above formula, $Q^1$ and $Q^2$ are independent of each other and each is a polymerizable group. The polymerization reaction of polymerizable groups is preferably addition polymerization (ring-opening polymerization) or condensation polymerization. In other words, the polymerizable groups are preferably functional groups capable of causing addition polymerization reaction or condensation polymerization reaction. Examples of a polymerizable group are illustrated below.

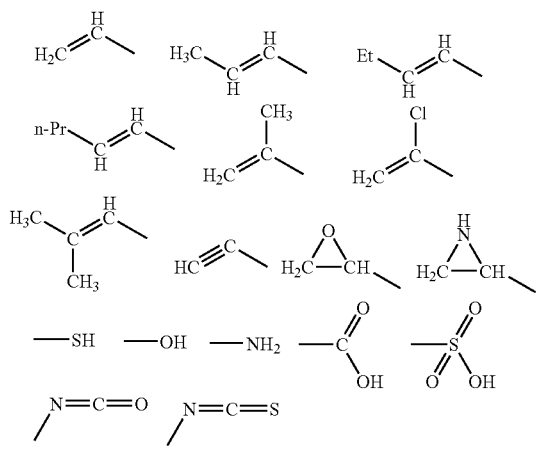

The divalent linkage groups represented by $L^1$, $L^2$ $L^3$ and $L^4$ are preferably divalent linkage groups selected from the class consisting of —O—, —S—, —CO—, —NR²—, —CO—O—, —O—CO—O—, —CO—NR²—, —NR²—CO—, —O—CO—, —O—CO—NR²—, —NR²—CO—O—, —NR²—CO—NR²— and a single bond. Herein, $R^2$ is a 1-7C alkyl group or a hydrogen atom. Each of $L^3$ and $L^4$ is preferably —O— or —O—CO—O—.

Of the groups which the combination of $Q^1$ and $L^1$ or the combination of $Q^2$ and $L^2$ can represent, $CH_2$=CH—CO—O—, $CH_2$=C(CH₃)—CO—O— and $CH_2$=C(Cl)—CO—O— are preferable, and $CH_2$=CH—CO—O— is especially preferred.

$A_1$ and $A_2$ each represent a spacer group having 2 to 20 carbon atoms, preferably a 2-12C aliphatic group. Further, it is preferable by far that the spacer group is in chain form. In addition, the space group may contain oxygen or sulfur atoms not adjacent to each other, and it may contain as a substituent a halogen atom (fluorine, chlorine, bromine), a cyano group, a methyl group or an ethyl group.

As to the mesogenic group represented by M, though any of known mesogenic groups can be used, the groups represented by the following formula (3) are especially preferable.

$$-(W^1\text{-}L^5)_n\text{-}W^2-\quad\text{Formula (3)}$$

$W^1$ and $W^2$ each represent a divalent cyclic aliphatic group, a divalent aromatic group or a divalent heterocycle group. Suitable examples of $W^1$ and $W^2$ each include 1,4-cyclohexanediyl, 1,4-phenylene, naphthalene-2,6-diyl and naphthalene-1,5-diyl. In the case of 1,4-cyclohexanediyl, there are structural isomers of cis-form and trans-form. In the invention, both isomers and cis-trans mixtures various in mixing ratio can be adopted, but trans-1,4-cyclohexanediyl is preferred over the others. $L^5$ is any of the groups represented by $L^1$ to $L^4$, —CH₂—O— or —O—CH₂—. The group suitable as $L^5$ is —CH₂—O—, —O—CH₂—, —CO—O—, —CO—NR²—, —NR²—CO— or —O—CO—. n is 1, 2 or 3, preferably 2. $W^1$ and $W^2$ each may have a substiutent. Examples of such a substituent include a halogen atom (a fluorine, chlorine, bromine or iodine atom), a cyano group, a 1-10C alkyl group (e.g., a methyl, ethyl or propyl group), a 1-10C alkoxy group (e.g., a methoxy or ethoxy group), a 1-10C acyl group (e.g., a formyl or acetyl group), a 2-20C alkoxycarbonyl group (e.g., a methoxycarbonyl or ethoxycarbonyl group), a 2-10C acyloxy group (e.g., an acetyloxy or propionyloxy group), a nitro group, a trifluoromethyl group and difluoromethyl group.

Examples of groups suitable as the fundamental skeletons of mesogenic groups represented by formula (3) are illustrated below. To these skeletons, the substituents as recited above may be attached.

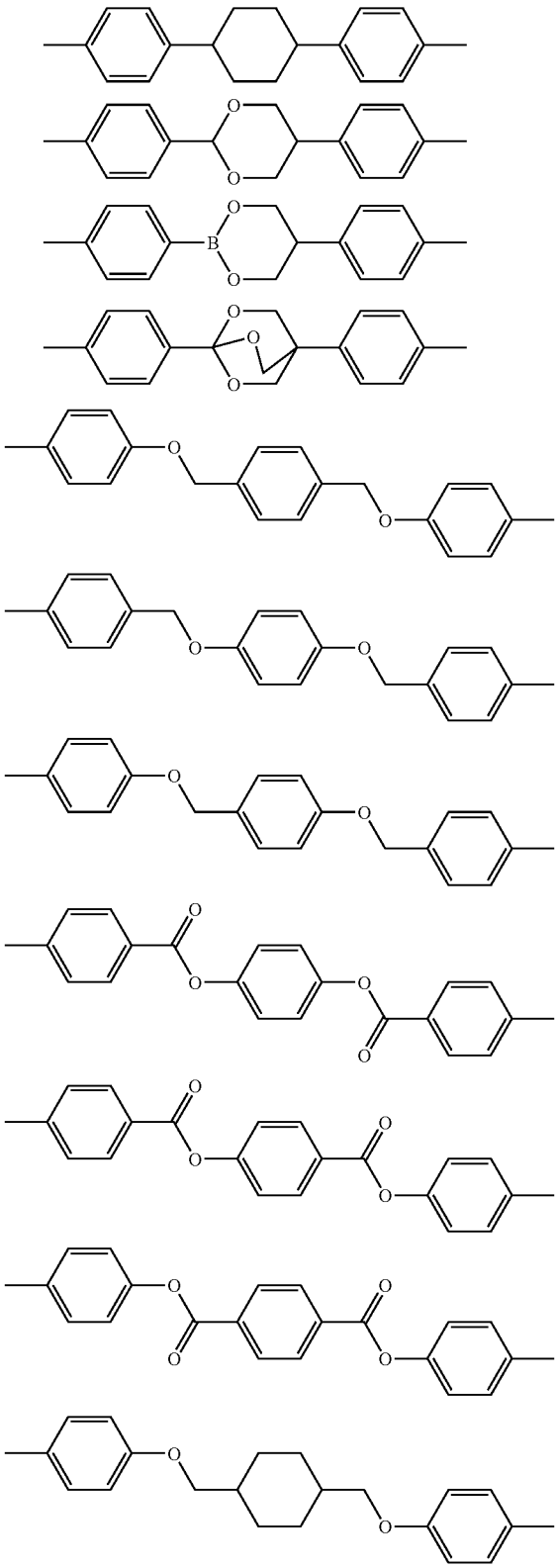

-continued

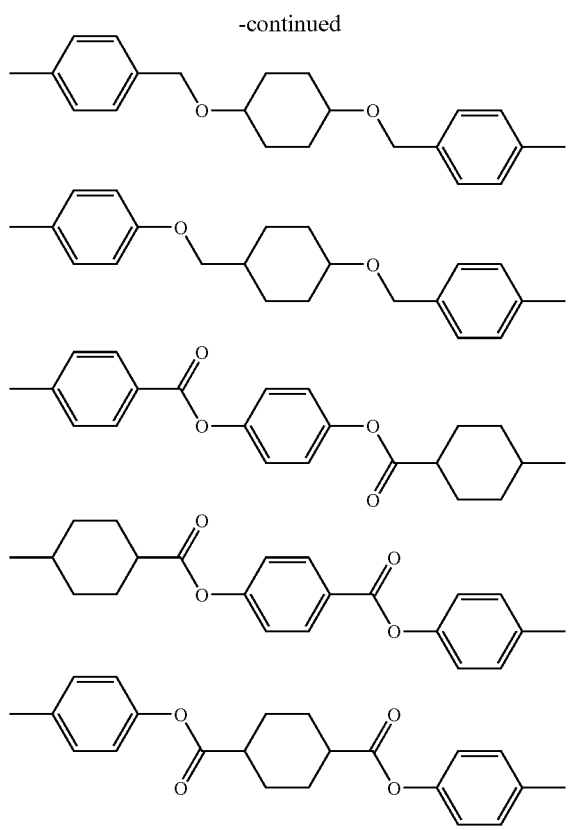

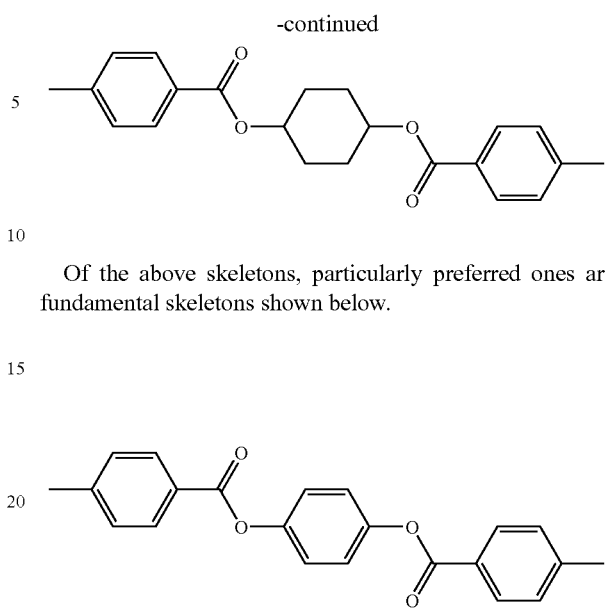

Of the above skeletons, particularly preferred ones are fundamental skeletons shown below.

Examples of a compound represented by formula (2) in the invention are illustrated below, but the invention should not be construed as being limited to these examples. The compounds represented by formula (2) can be synthesized by reference to the methods described in JP-T-11-513019 (the term "JP-T" as used herein means a published Japanese translation of a PCT patent application).

I-1

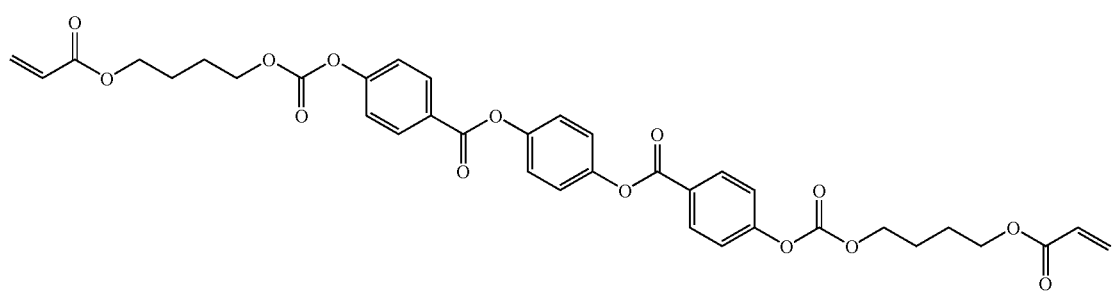

I-2

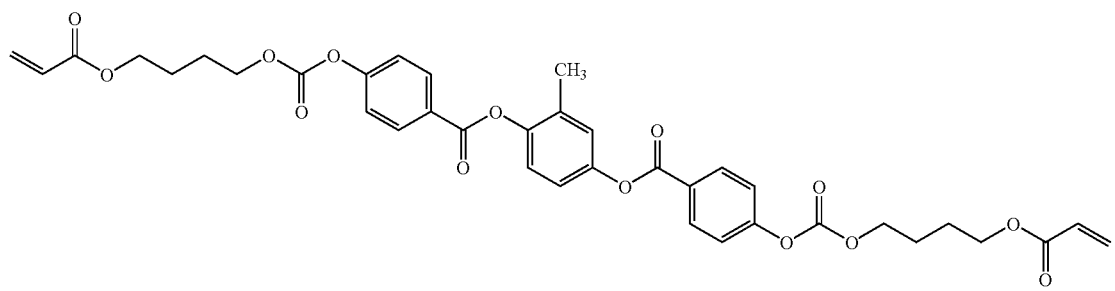

-continued
I-3
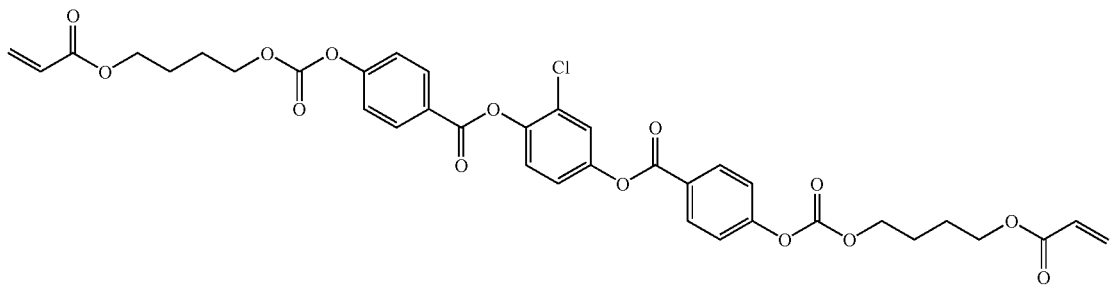
I-4
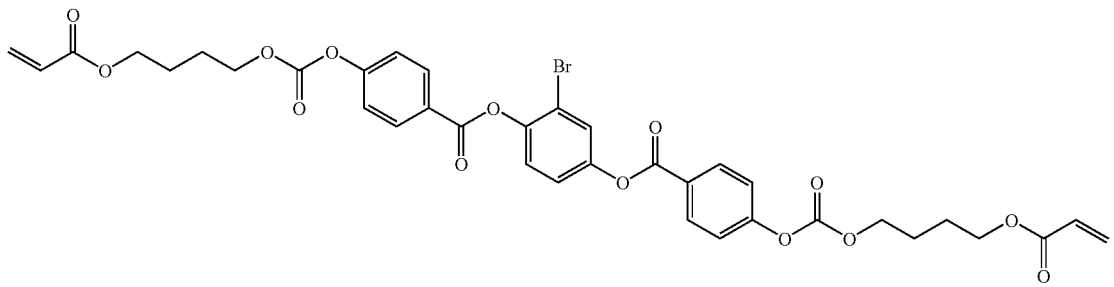
I-5
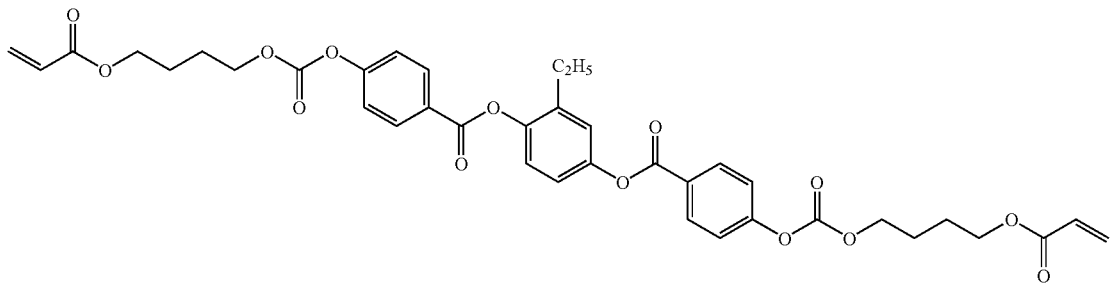
I-6
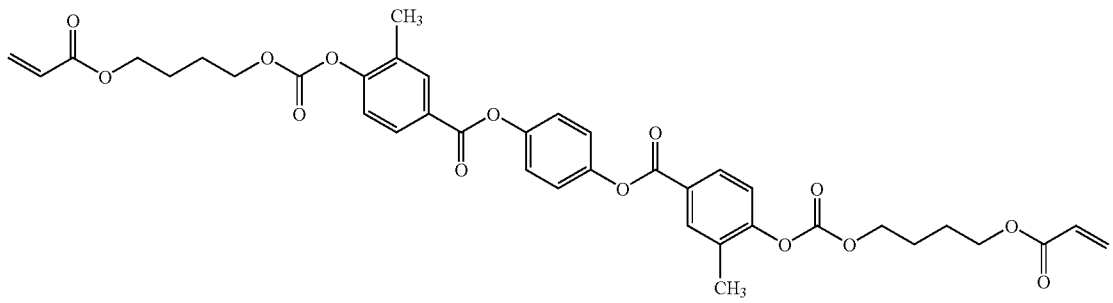
I-7
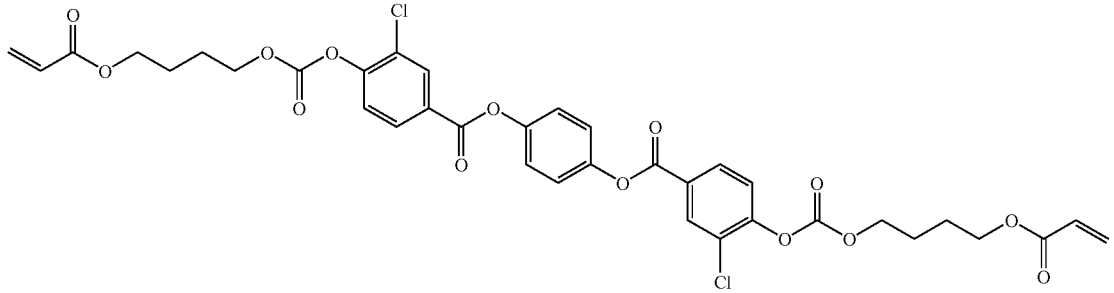

-continued
I-8
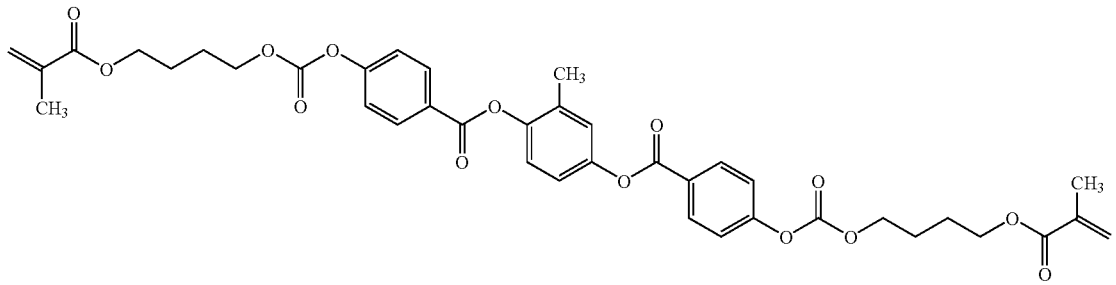
I-9
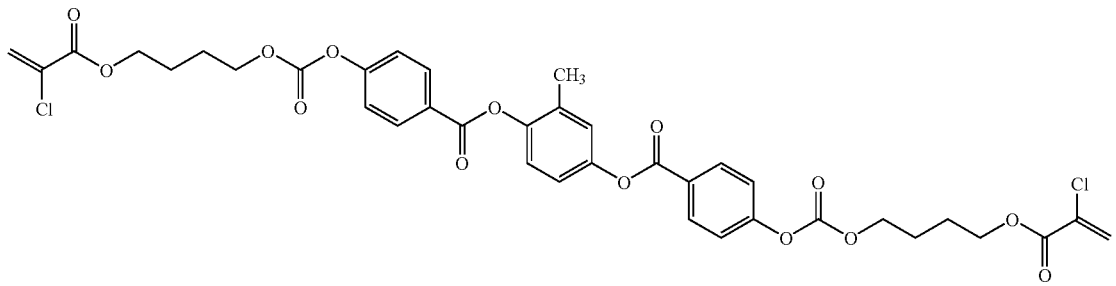
I-10
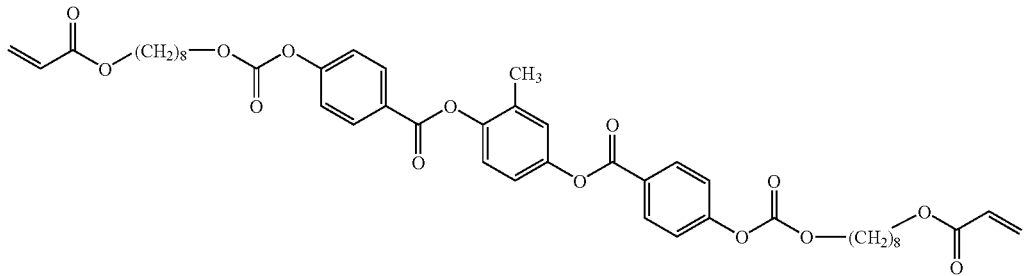
I-11
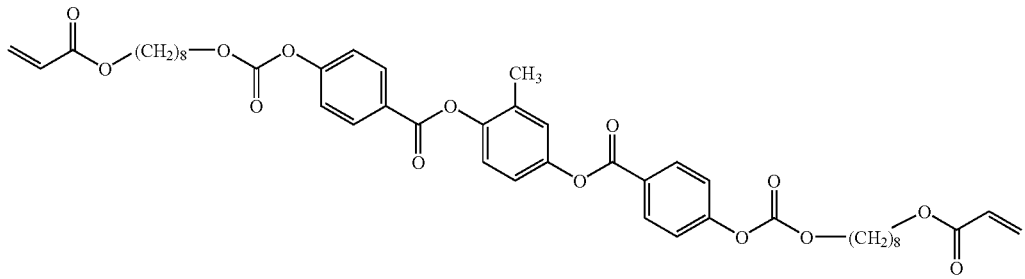
I-12
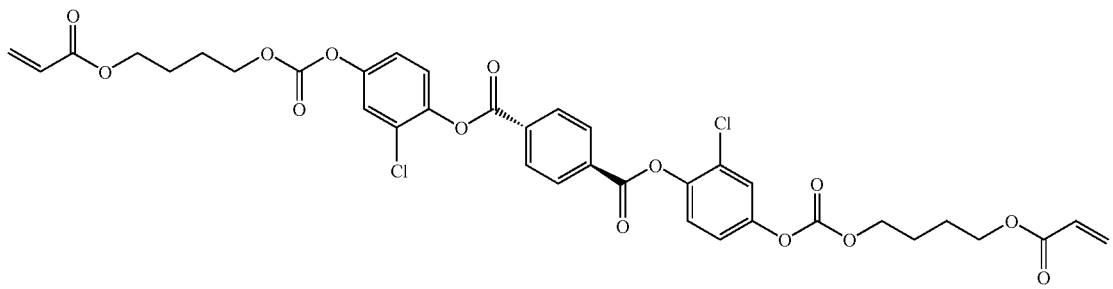

I-13
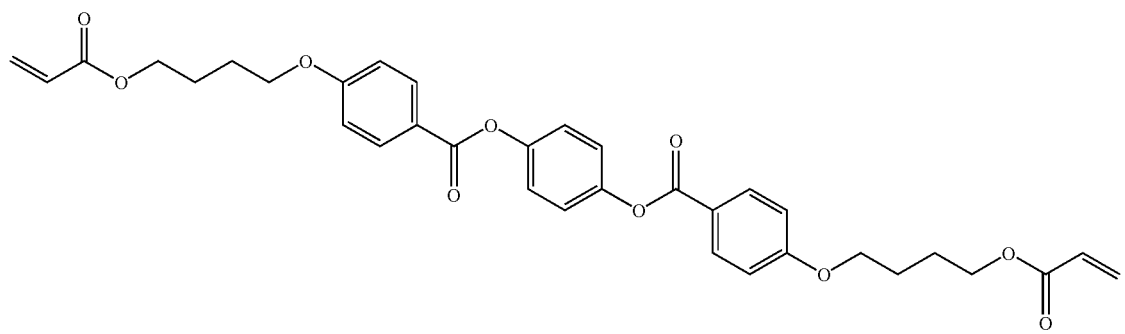
I-14
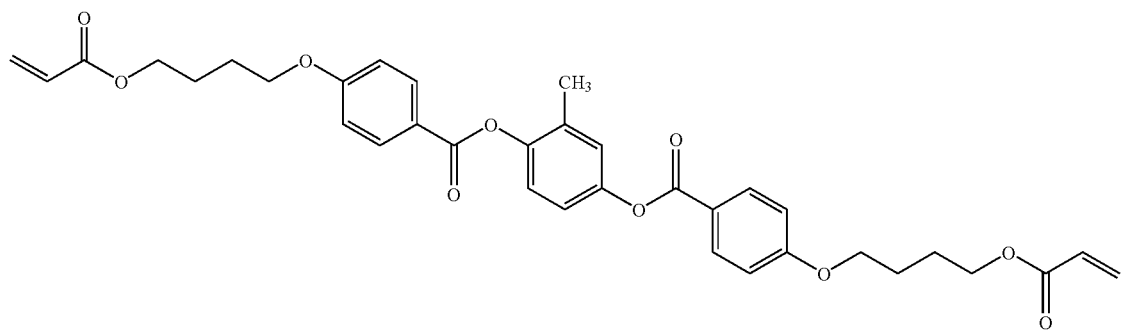
I-15
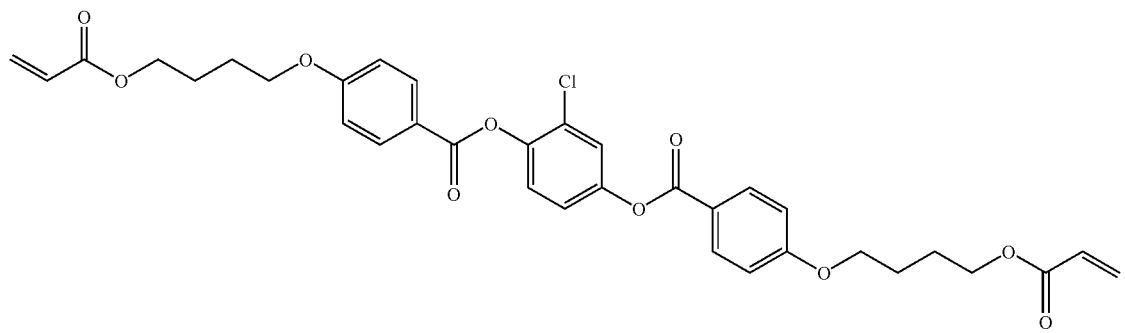
I-16
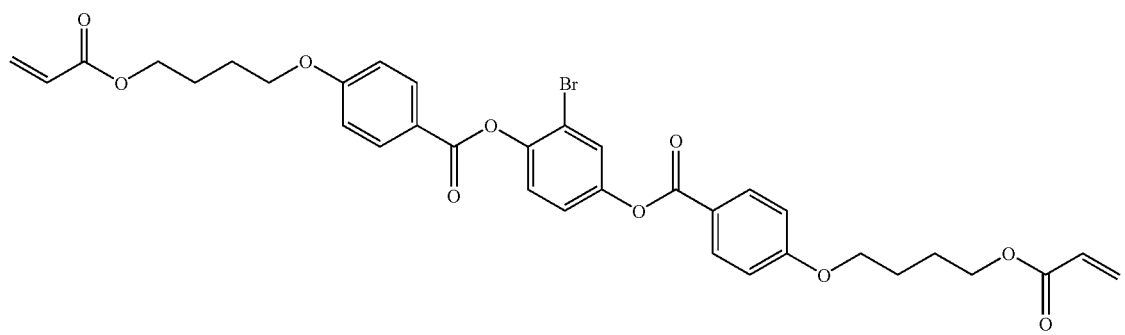

I-17
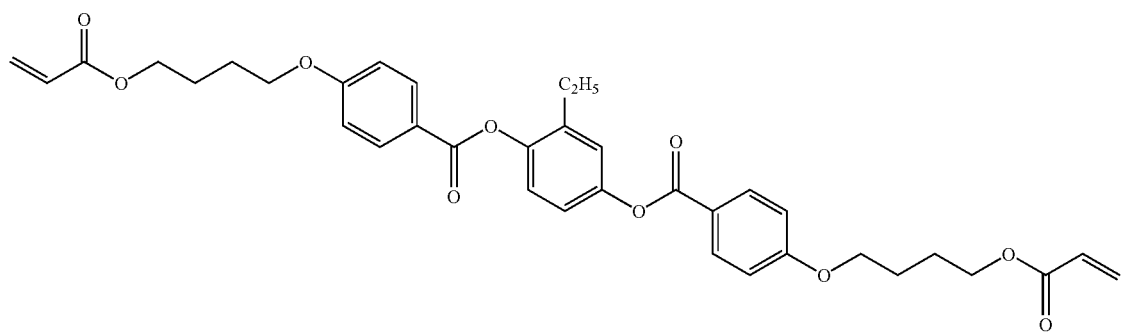
I-18
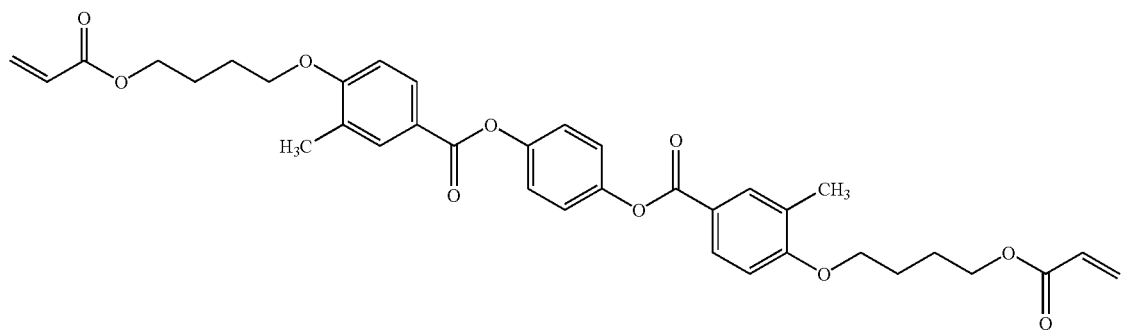
I-19
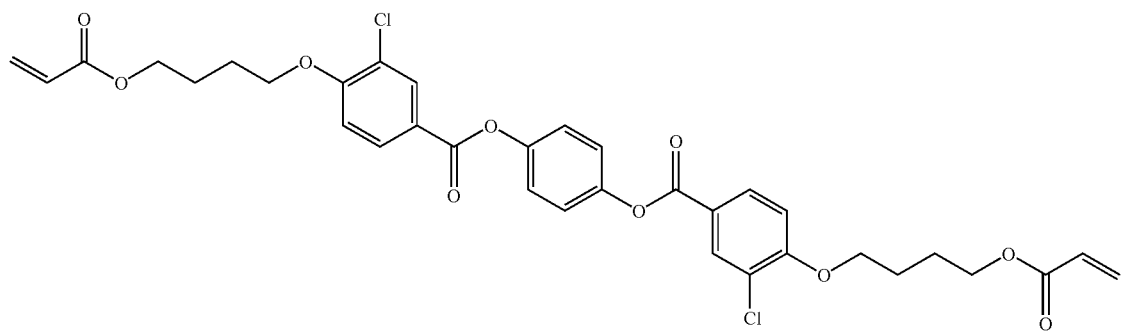
I-20
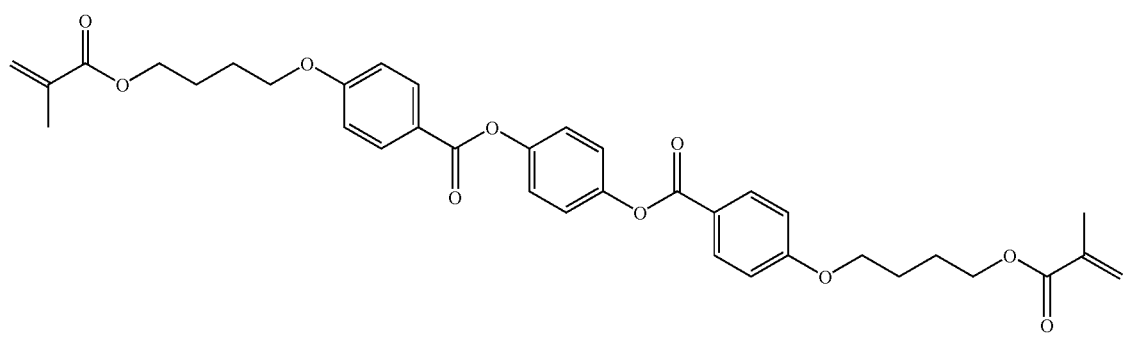

I-21
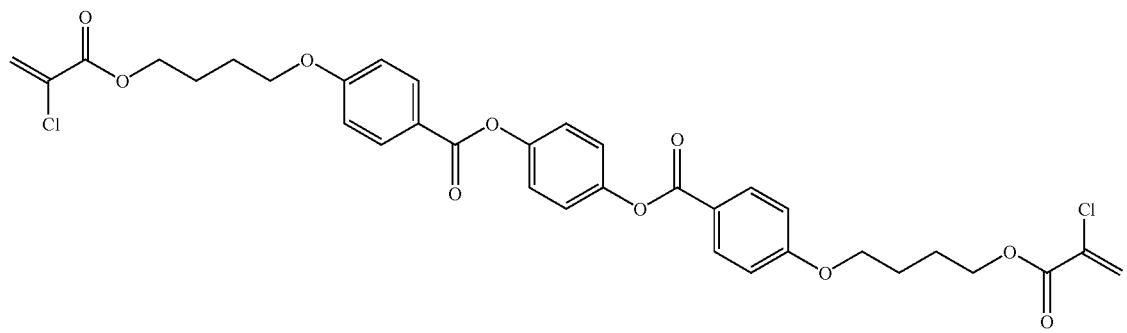
I-22
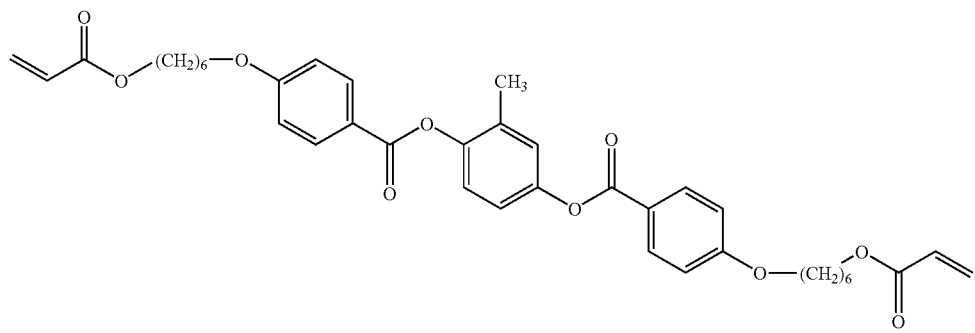
I-23
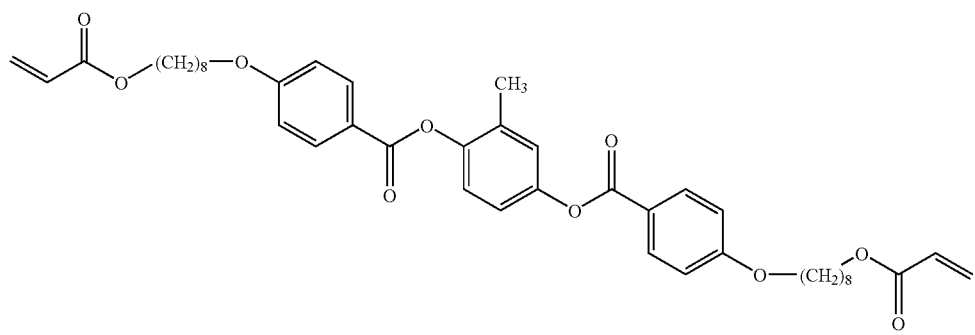
I-24
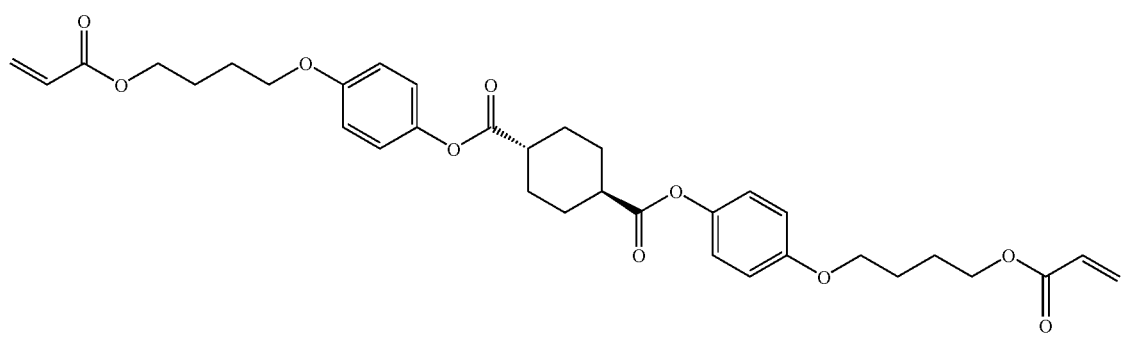

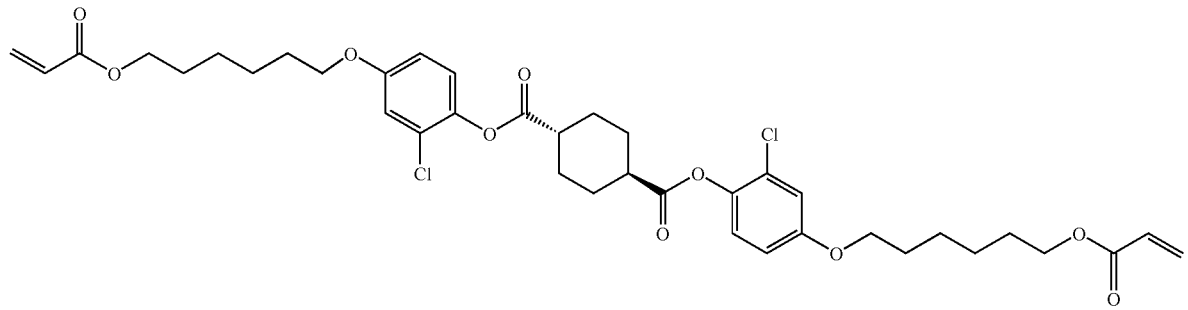

I-25

Suitable examples of an optical anisotropy developing agent containing no polymerizable group include rod-shaped compounds represented by the following formula (4).

In the above formula, $Ar^1$ represents an aryl group or a heteroaryl group, $Ar^2$ represents an arylene group or a heteroarylene group, and $Ar^3$ represents an aryl group, an arylcarbonyl group or a heteroaryl group. $L^1$ and $L^2$ each represent a single bond or a divalent linkage group independently n is an integer of 3 or above. $Ar^2$s may be the same or different, and $L^2$s may be the same or different, too.

In formula (4), $Ar^1$ represents an aryl group or a heteroaryl group, and $Ar^3$ represents an aryl group, an arylcarbonyl group or a heteroaryl group. $Ar^1$ and $Ar^3$ may be the same or different. As aryl groups represented by $Ar^1$ and $Ar^3$, 6-30C aryl groups are suitable. These aryl groups may be monocyclic, or they may be fused together with other rings to form fused rings. Further, they may have substituents, if possible. To such substituents, Substituent T described hereinafter can be applied.

The aryl groups more suitable as $Ar^1$ and $Ar^3$ in formula (4) are 6-20C aryl groups, especially 6-12C aryl groups. Examples of such aryl groups include phenyl, p-methylphenyl and naphthyl groups.

Examples of an arylcarbonyl group represented by $Ar^3$ include carbonyl groups having the aryl groups as recited above.

$Ar^2$ represents an arylene group or a heteroarylene group, and all the $Ar^2$s in the repeating units may be the same or different. As to the arylene groups, those having 6 to 30 carbon atoms are suitable. The arylene groups may be monocyclic, or they may be fused together with other rings to form fused rings. Further, they may have substituents, if possible. To such substituents, Substituent T described hereinafter can be applied. The arylene groups more suitable as $Ar^2$ in formula (4) are 6-20C arylene groups, especially 6-12C arylene groups. Examples of such arylene groups include phenylene, p-methylphenylene and naphthylene groups.

Aromatic heterocycles from which the groups represented by $Ar^1$, $Ar^2$ and $Ar^3$ in formula (4) are derived have no particular restrictions so far as at least one oxygen, nitrogen or sulfur atom is contained in each individual aromatic ring. Those suitable as the aromatic heterocycles are 5- or 6-membered aromatic heterocycles which each contain at least one oxygen, nitrogen or sulfur atom. These aromatic heterocycles may have substituents, if possible. To such substituents, Substituent T described hereinafter can be applied. Incidentally, the groups derived from aromatic heterocycles and represented by $Ar^1$ and $Ar^3$ are in principle univalent groups, and the group derived from an aromatic heterocycle and represented by $Ar^2$ is in principle a divalent group.

Examples of aromatic heterocycles from which the groups represented by $Ar^1$, $Ar^2$ and $Ar^3$ in formula (4) are derived include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene, pyrrolotrizole and pyrazolotriazole. Of these aromatic heterocycles, benzimidazole, benzoxazole, benzothiazole and benzotriazole are preferred over the others.

$L^1$ and $L^2$ in formula (4) each represent a single bond or a divalent linkage group independently. $L^1$ and $L^2$ may be the same or different. In addition, all the $L^2$s in repeating units may be the same or different.

Suitable examples of such a divalent linkage group include a group represented by —$NR^7$— (wherein $R^7$ represents a hydrogen atom, or an alkyl or aryl group which may have a substituent), —$SO_2$—, —CO—, an alkylene group, a substituted alkylene group, an alkenylene group, a substituted alkenylene group, an alkynylene group, —O—, —S—, —SO—, or a combination of two or more groups selected from those recited above. Of these divalent groups, —O—, —CO—, —$SO_2NR^7$—, —$NR^7SO_2$—, —$CONR^7$—, —COO—, —OCO— and an alkynylene group are preferred over the others. Further, —$CONR^7$—, —$NR^7CO$—, —COO—, —OCO— and an alkynylene in particular are advantageous. In each of the above linkage group examples, it is preferable that the bonding hand at the left binds to $Ar^1$ or $Ar^3$, and the bonding hand at the right is a bonding hand directing to $Ar^2$ situated in the molecular center.

As to the compounds represented by formula (4) in the invention, though the $Ar^2$ is combined with $L^1$ and $L^2$ and present in a state of $L^1$-$Ar^2$-$L^2$ or $L^2$-$Ar^2$-$L^2$, it is most favorable in the case where the $Ar^2$ is a phenylene group that the bonding sites of the phenylene group stand in a para-position (1,4-position) relationship.

In formula (4), n is an integer of 3 or above, preferably 3 to 7, far preferably 3 to 5.

Of the compounds represented by formula (4), compounds represented by the following formula (5) are advantageous.

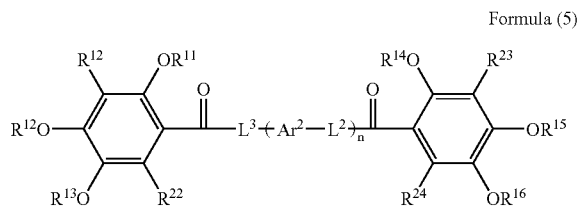

Formula (5)

In the above formula, $R^{11}$, $R^{12}$, $R^{13}$, $R^{14}$, $R^{15}$, $R^{16}$, $R^{2'}$, $R^{22}$, $R^{23}$ and $R^{24}$ each represent a hydrogen atom or a substituent independently. $Ar^2$ represents an arylene group or a heteroarylene group, and $L^2$ and $L^3$ each represent a single bond or a divalent linkage group independently. n represents an integer of 3 or above. $Ar^2$s may be the same or different, and $L^2$s may also be the same or different.

The compounds represented by formula (5) are described below in detail. $Ar^2$, $L^2$ and n in formula (5) are the same as in those in formula (4), respectively And $L^3$ represents a single bond or a divalent linkage group, and suitable examples of such a divalent linkage group include a group represented by —$NR^7$— (wherein $R^7$ represents a hydrogen atom, or an alkyl or aryl group which may have a substituent), an alkylene group, a substituted alkylene group, —O— and groups obtained by combining two or more groups of the groups recited above. Of these groups, —O—, —$NR^7$—, —$NR^7SO_2$— and —$NR^7CO$— are preferred over the others.

In formula (5), $R^{11}$, $R^{12}$, $R^{13}$, $R^{14}$, $R^{15}$ and $R^{16}$ each represent a hydrogen atom or a substituent independently, and each of them is preferably a hydrogen atom, an alkyl group or an aryl group, far preferably a hydrogen atom, a 1-4C alkyl group (such as a methyl group, an ethyl group, a propyl group or an isopropyl group) or a 6-12C aryl group (such as a phenyl group or a naphthyl group), especially preferably a 1-4C alkyl group. These groups may further have Substituent T described hereinafter as their respective substituents.

In formula (5), $R^{2'}$, $R^{22}$, $R^{33}$ and $R^{24}$ each represent a hydrogen atom or a substituent independently, and each of them is preferably a hydrogen atom, an alkyl group, an alkoxy group or a hydroxyl group, far preferably a hydrogen atom or an alkyl group (preferably a 1-4C alkyl group, especially a methyl group). These groups may further have Substituent T described hereinafter as their respective substituents.

The foregoing Substituent T is explained below.

The Substituent T preferably represents a halogen atom (e.g., a fluorine atom, a chlorine atom, a bromine atom, an iodine atom), an alkyl group (preferably a 1-30 C alkyl group, such as a methyl group, an ethyl group, an n-propyl group, an isopropyl group, a t-butyl group, an n-octyl group or a 2-ethylhexyl group), a cycloalkyl group (preferably a 3-30C substituted or unsubstituted cycloalkyl group, such as a cyclohexyl group, a cyclopentyl group or a 4-n-dodecylcyclohexyl group), a bicycloalkyl group (preferably a 5-30C substituted or unsubstituted bicycloalkyl group, namely a univalent group formed by removing one hydrogen atom from a 5-30C bicycloalkane, such as bicyclo[1,2,2]heptane-2-yl or bicyclo[2,2,2]octane-3-yl), an alkenyl group (preferably a 2-30C substituted or unsubstituted alkenyl group, such as a vinyl group or an allyl group), a cycloalkenyl group (preferably a 3-30C substituted or unsubstituted cycloalkenyl group, namely a univalent group formed by removing one hydrogen atom from a 3-30C cycloalkene, such as 2-cyclopentene-1-yl or 2-cyclohexene-1-yl), a bicycloalkenyl group (a substituted or unsubstituted bicycloalkenyl group, preferably a 5-30C substituted or unsubstituted bicycloalkenyl group, namely a univalent group formed by removing one hydrogen atom from a bicycloalkene having one double bond, such as bicyclo [2,2,1]hept-2-ene-1-yl or bicyclo[2,2,2]oct-2-ene-4-yl), an alkynyl group (preferably a 2-30C substituted or unsubstituted alkynyl group, such as an ethynyl group or a propargyl group), an aryl group (preferably a 6-30C substituted or unsubstituted aryl group, such as a phenyl group, a p-tolyl group or a naphthyl group), a heterocyclic group (preferably a univalent group formed by removing one hydrogen atom from a 5- or 6-membered, substituted or unsubstituted, aromatic or non-aromatic heterocyclic compound, far preferably a 3-30C, 5- or 6-membered heteroaryl group, such as a 2-furyl group, a 2-thienyl group, a 2-pyrimidinyl group or a 2-benzothiazolyl group); a cyano group, a hydroxyl group, a nitro group, a carboxyl group, an alkoxy group (preferably a 1-30C substituted or unsubstituted alkoxy group, such as a methoxy group, an ethoxy group, an isopropoxy group, a t-butoxy group 1, an n-octyloxy group or a 2-methoxyethoxy group), an aryloxy group (preferably a 6-30C substituted or unsubstituted aryloxy group, such as a phenoxy group, a 2-methylphenoxy group, a 4-tert-butylphenoxy group, a 3-nitrophenoxy group or a 2-tetradecanoylaminophenoxy group), a silyloxy group (preferably a 3-20C silyloxy group, such as a trimethylsilyloxy group or a tert-butyldimethylsilyloxy group), a heterocyclyloxy group (preferably a 2-30C substituted or unsubstituted heterocyclyloxy group, such as a 1-phenyltetrazole-5-oxy group or a 2-tetrahydropyranyloxy group), an acyloxy group (preferably a formyloxy group, a 2-30C substituted or unsubstituted alkylcarbonyloxy group or a 6-30C substituted or unsubstituted arylcarbonyloxy group, such as a formyloxy group, an acetyloxy group, a pivaroyloxy group, a stearoyloxy group, a benzoyloxy group or a p-methoxyphenylcarbonyloxy group), a carbamoyloxy group (preferably a 1-30C substituted or unsubstituted carbamoyloxy group, such as an N,N-dimethylcarbamoyloxy group, an N,N-diethylcarbarnoyloxy group, a morpholinocarbonyloxy group, an N,N-di-n-octylaminocarbonyloxy group or an N-n-octylcarbamoyloxy group), an alkoxycarbonyloxy group (preferably a 2-30C substituted or unsubstituted alkoxycarbonyloxy group, such as a methoxycarbonyloxy group, an ethoxycarbonyloxy group, a tert-butoxycarbonyloxy group or an octylcarbonyloxy group), an aryloxycarbonyloxy group (preferably a 7-30C substituted or unsubstituted aryloxycarbonyloxy group, such as a phenoxycarbonyloxy group, a p-methoxyphenoxycarbonyloxy group or a p-n-hexadecyloxyphenoxycarbonyloxy group); an amino group (preferably an amino group, a 1-30C substituted or unsubstituted alkylamino group or a 6-30C substituted or unsubstituted anilino group, such as an amino group, a methylamino group, a dimethylamino group, an anilino group, an N-methylanilino group or a diphenylamino group), an acylamino group (preferably a formylamino group, a 1-30C substituted or unsubstituted alkylcarbonylamino group or a 6-30C substituted or unsubstituted arylcarbonylamino group, such as a formylamino group, an acetylamino group, a pivaroylamino group, a lauroylamino group or a benzoylamino group), an aminocarbonylamino group (preferably a 1-30C substituted or unsubstituted aminocarbonylamino group, such as a carbamoylamino group, an N,N-dimethylaminocarbonylamino group, an N,N-diethylaminocarbonylamino group or a morpholinocarbonylamino group), an alkoxycarbonylamino group (preferably a 2-30C substituted or unsubstituted alkoxycarbonylamino group, such as a methoxycarbonylamino group, an ethoxycarbonylamino group, a tert-butoxycarbonylamino group, an n-octadecyloxycarbonylamino group or an N-methyl-methoxycarbonylamino group), an aryloxycarbonylamino group (preferably a 7-30C substituted or unsubstituted aryloxycarbonylamino group, such as a phenoxycarbonylamino group, p-chlorophenoxycarbonylamino group or a m-n-octyloxyphenoxycarbonylamino group), a sulfamoylamino group (preferably a 0-30C substituted or unsubstituted sulfamoyl group, such as a sulfamoylamino group, an N,N-dimethylaminosulfonylamino group or an N-n-octylaminosulfonylamino group), alkyl- and arylsulfonylamino groups (preferably a 1-30C substituted or unsubstituted alkylsulfonylamino group and a 6-30C substituted or unsubstituted arylsulfonylamino group, such as a methylsulfonylamino group, a butylsulfonylamino group, a phenylsulfonylamino group, 2,3,5-trichlorophenylsulfonylamino group and a p-methylphenylsulfonylamino group); a mercapto group, an alkylthio group (preferably a 1-30C substituted or unsubstituted alkylthio group, such as methylthio group, an ethylthio group or an n-hexadecylthio group), an arylthio group (preferably a 6-30C substituted or unsubstituted arylthio group, such as a phenylthio group, a p-chlorophenylthio group or m-methoxyphenylthio group), a heterocyclylthio group (preferably a 2-30C substituted or unsubstituted heterocyclylthio group, such as a 2-benzothiazolylthio group or a 1-phenyltetrazol-5-ylthio group), a sulfamoyl group (preferably a 0-30C substituted or unsubstituted sulfamoyl group, such as an N-ethylsulfamoyl group, an N-(3-dodecyloxypropyl)sulfamoyl group, an N,N-diethylsulfamoyl group, an N-acetylsulfamoyl group, an N-benzoylsulfamoyl group or an N—(N'-phenylcarbamoyl)sulfamoyl group), a sulfo group, alkyl- and arylsulfinyl groups (preferably a 1-30C substituted or unsubstituted alkylsulfinyl group and a 6-30C substituted or unsubstituted arylsulfinyl group, such as a methylsulfinyl group, an ethylsulfinyl group, a phenylsulfinyl group and a p-methylphenylsulfinyl group), alkyl- and arylsulfonyl group (preferably a 1-30C substituted or unsubstituted alkylsulfonyl group and a 6-30C substituted or unsubstituted arylsulfonyl group, such as a methylsulfonyl group, an ethylsulfonyl group, a phenylsulfonyl group and a p-methylphenylsulfonyl group), an acyl group (preferably a formyl group, a 2-30C substituted or unsubstituted alkylcarbonyl group or a 7-30C substituted or unsubstituted arylcarbonyl group, such as an acetyl group or a pivaroylbenzoyl group), an aryloxycarbonyl group (preferably a 7-30C substituted or unsubstituted aryloxycarbonyl group, such as a phenoxycarbonyl group, an o-chlorophenoxycarbonyl group, a m-nitrophenoxycarbonyl group or a p-tert-butylphenoxycarbonyl group), an alkoxycarbonyl group (preferably a 2-30C substituted or unsubstituted alkoxycarbonyl group, such as a methoxycarbonyl group, an ethoxycarbonyl group, a tert-butoxycarbonyl group or an n-octadecyloxycarbonyl group), a carbamoyl group (preferably a 1-30C substituted or unsubstituted carbamoyl group, such as a carbamoyl group, an N-methylcarbamoyl group, an N,N-dimethylcarbarnoyl group, an N,N-di-n-octylcarbarnoyl group or an N-(methylsulfonyl)carbamoyl group); aryl- and heterocyclylazo group (preferably a 6-30C substituted or unsubstituted arylazo group and a 3-30C substituted or unsubstituted heterocyclylazo group, such as a phenylazo group, a p-chlorophenylazo group and a 5-ethylthio-1,3,4-thiadiazol-2-ylazo group), an imido group (preferably an N-succinimido group or an N-phthalimido group), a phosphino group (preferably a 2-30C substituted or unsubstituted phosphino group, such as a dimethylphosphino group, a diphenylphosphino group or a methylphenoxyphosphino group), a phosphinyl group (preferably a 2-30C substituted or unsubstituted phosphinyl group, such as a phosphinyl group, a dioctyloxyphosphinyl group or a diethoxyphosphinyl group), a phosphinyloxy group (preferably a 2-30C substituted or unsubstituted phosphinyloxy group, such as diphenoxyphosphinyl group or a dioctyloxyphosphinyloxy group), a phosphinylamino group (preferably a 2-30C substituted or unsubstituted phosphinylamino group, such as dimethoxyphosphinylamino group or a dimethylaminophosphinylamino group), or a silyl group (preferably a 3-30C substituted or unsubstituted silyl group, such as a trimethylsilyl group, a tert-butyldimethylsilyl group or a phenyldimethylsilyl group).

Of the substituents recited above as the Substituent have those having hydrogen atoms may further undergo substitution of any of the substituents for their hydrogen atoms. Examples of substituents formed by such substitution include alkylcarbonylaminosulfonyl groups, arylcarbonylaminosulfonyl groups, alkylsulfonylaminocarbonyl groups and arylsulfonylaminocarbonyl groups. Specific examples of these groups include a methylsulfonylaminocarbonyl group, a p-methylphenylsulfonylaminocarbonyl group, an acetylaminosulfonyl group and a benzoylaminosulfonyl group.

When two or more substituents are present, they may be the same or different, and they may combine with each other to form a ring structure, if possible.

The compounds represented by formula (5) prefer having such constitutions that:

$R^{11}$, $R^{12}$, $R^{13}$, $R^{14}$, $R^{15}$ and $R^{16}$ each represent a hydrogen atom or an alkyl group independently, preferably a 1-4C alkyl group, far preferably a methyl group;

$R^{21}$, $R^{22}$, $R^{23}$ and $R^{24}$ are each a hydrogen atom;

$A^{21}$ is a substituted or unsubstituted arylene group, preferably a substituted or unsubstituted 6-20C arylene group, far preferably a substituted or unsubstituted phenylene group;

$L^2$ is a single bond, —COO—, —OCO—, —CONR$^7$—, —NR$^7$CO—, —NR$^7$—, —CONR$^7$— (wherein $R^7$ is a hydrogen atom, or an alkyl or aryl group which may have a substituent), —O— or an alkynylene group;

$L^3$ is —O— or —NR$^7$— (wherein $R^7$ is a hydrogen atom, or an alkyl or aryl group which may have a substituent); and n is an integer of 3 or above, preferably 3 to 7, far preferably 3 to 5.

Examples of compounds represented by formula (4) or (5) (Exemplified Compounds (1) to (4)) are illustrated below. However, these examples should not be construed as limiting the scope of the invention in any way.

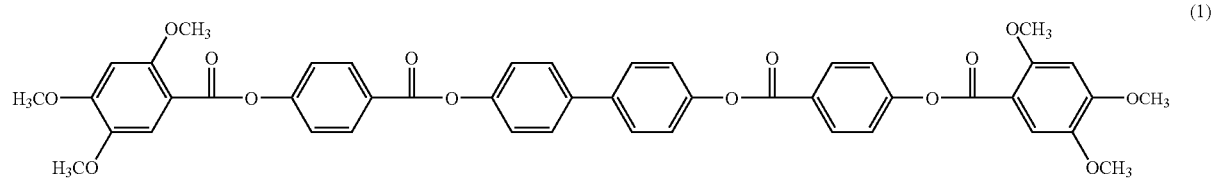

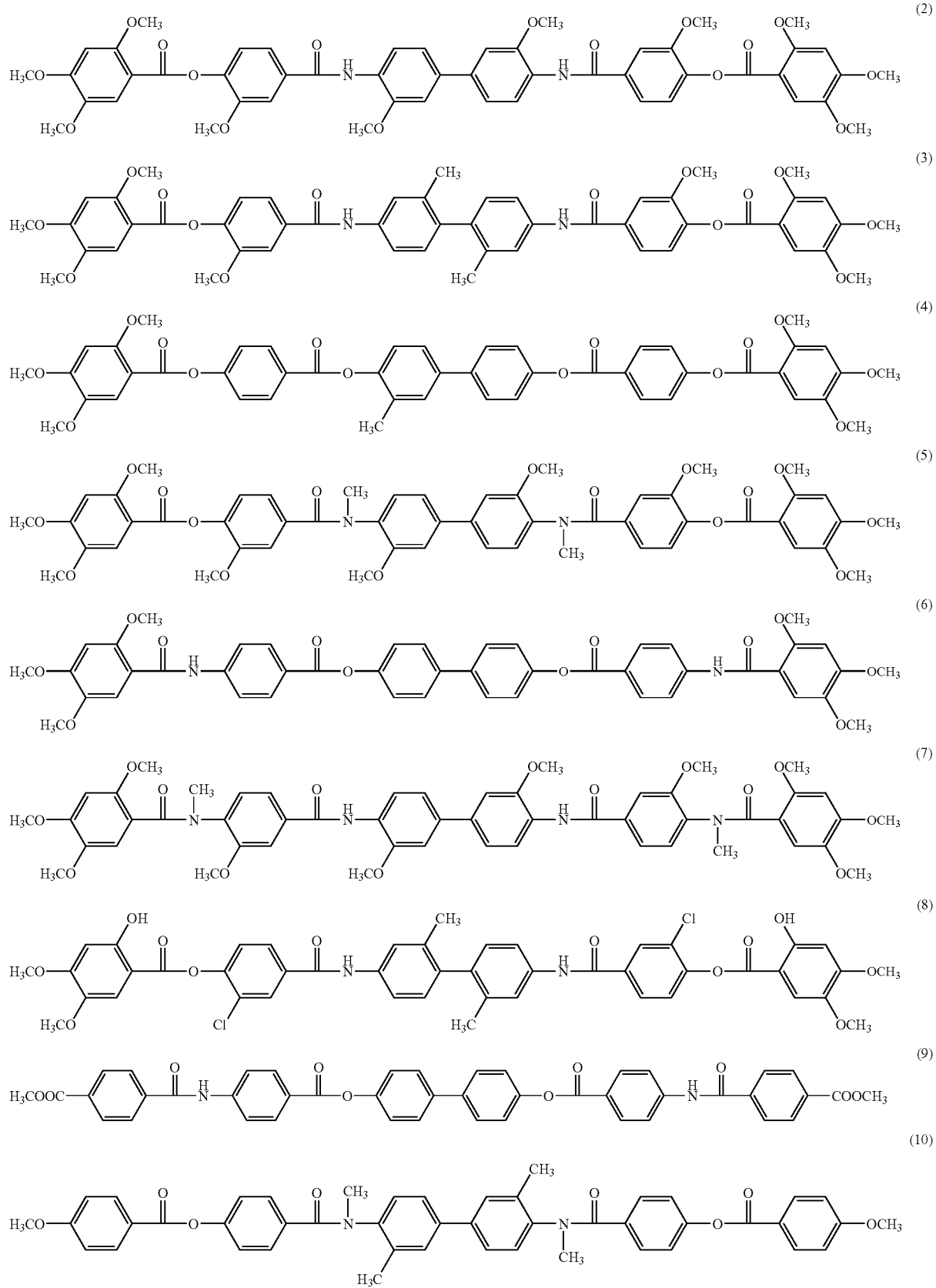

(11)
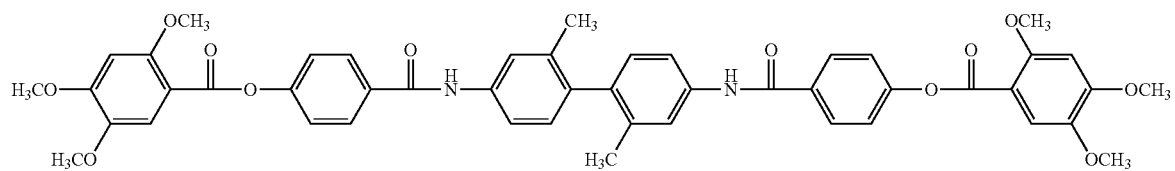
(12)
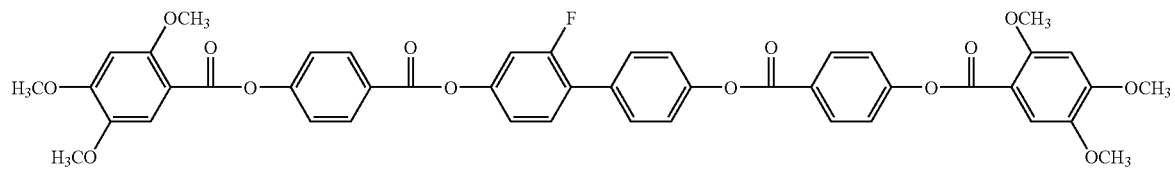
(13)
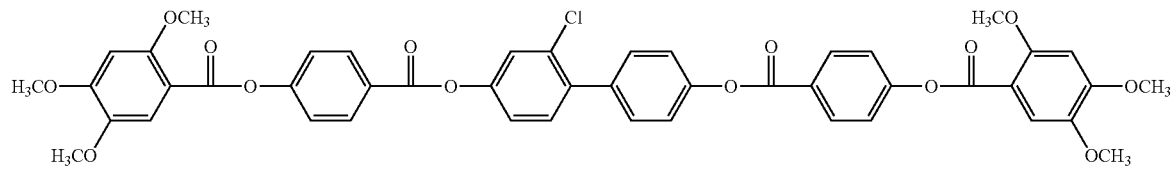
(14)
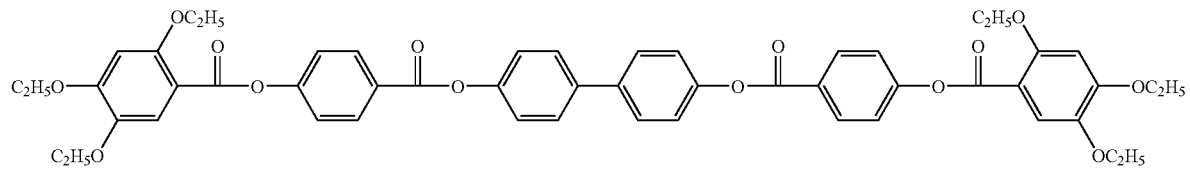
(15)
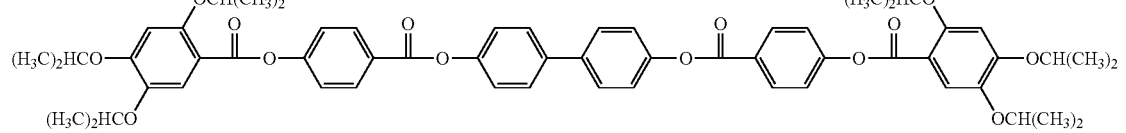
(16)
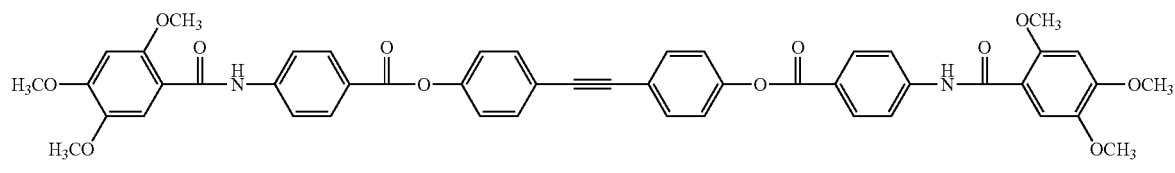
(17)
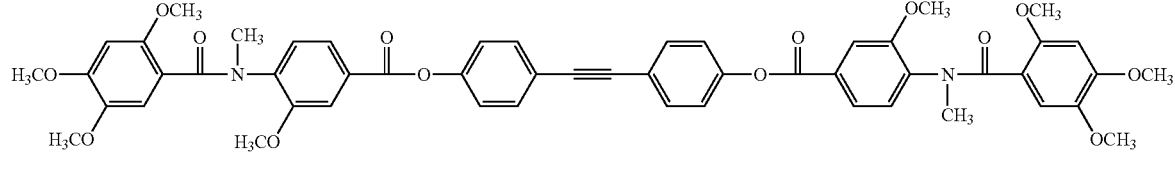
(18)
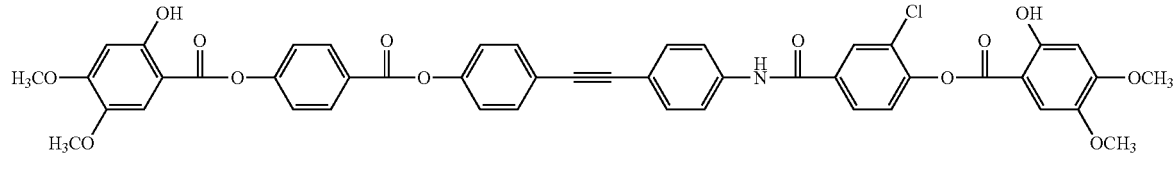
(19)

-continued
(20)
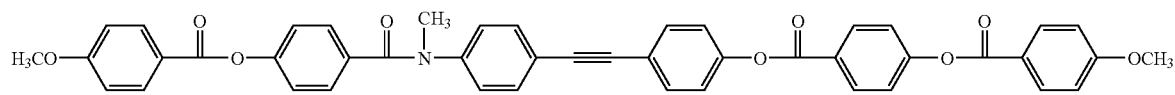
(21)
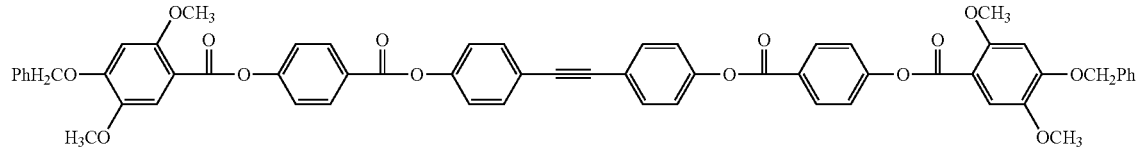
(22)
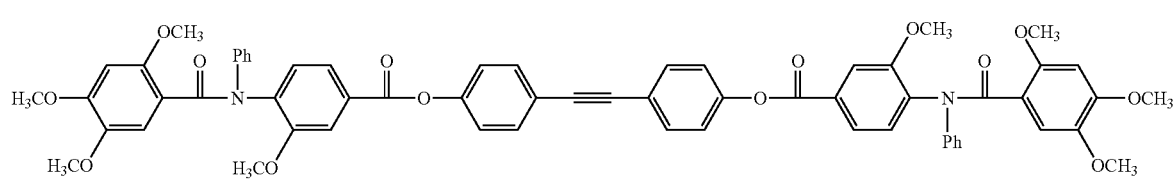
(23)
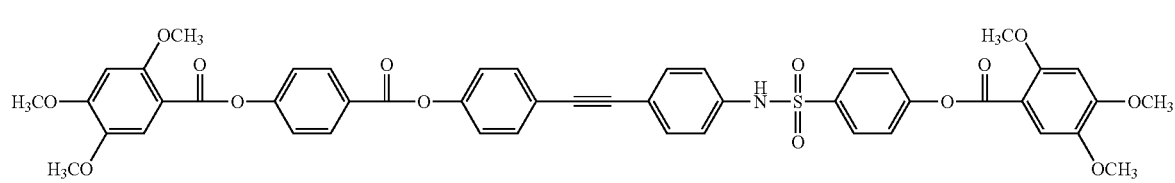
(24)
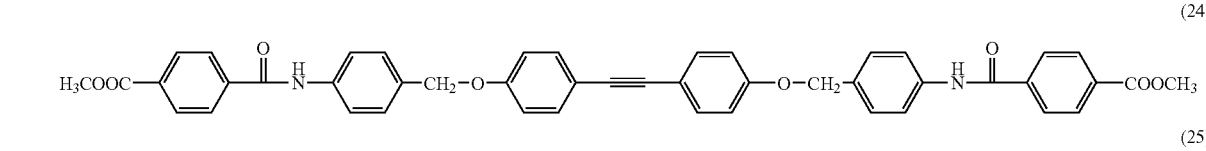
(25)
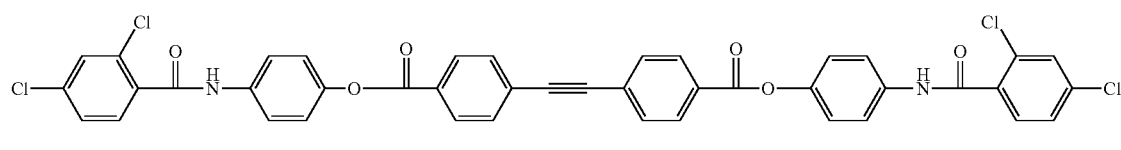
(26)
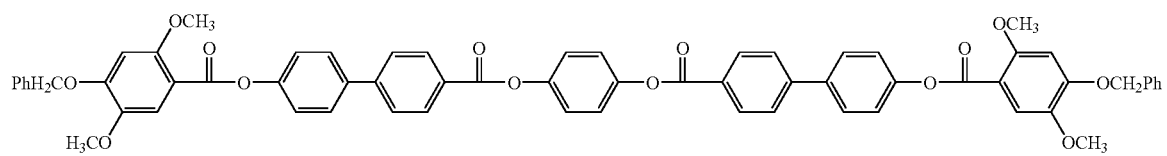
(27)
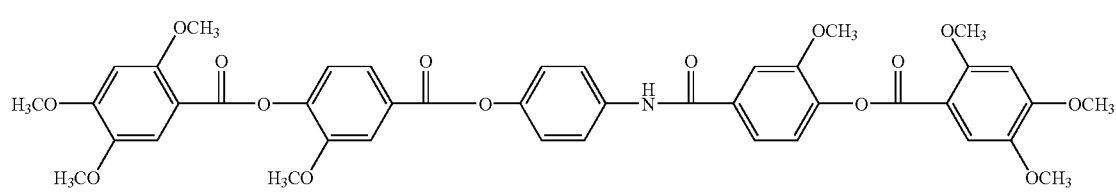
(28)
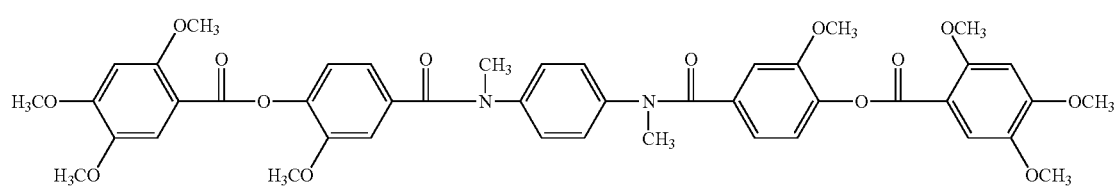

-continued
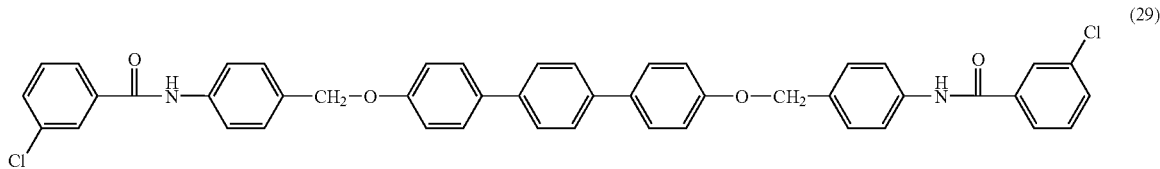
(29)
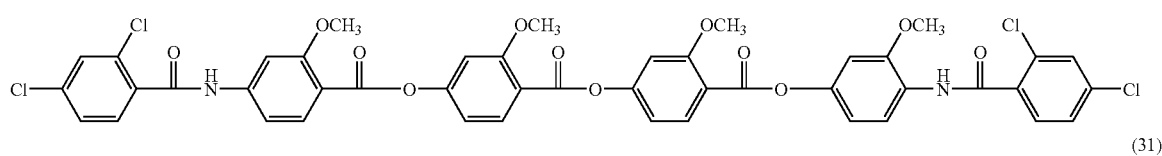
(30)
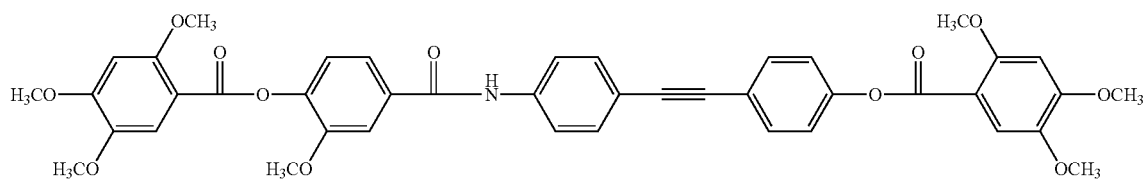
(31)
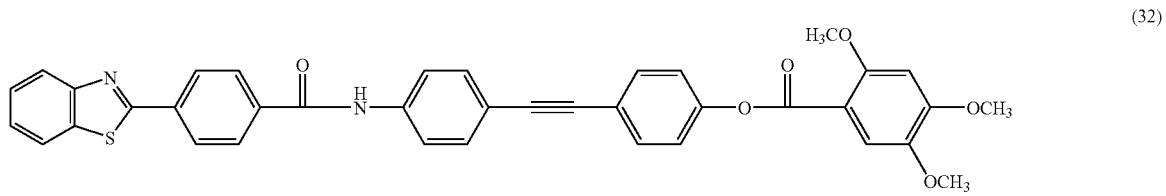
(32)
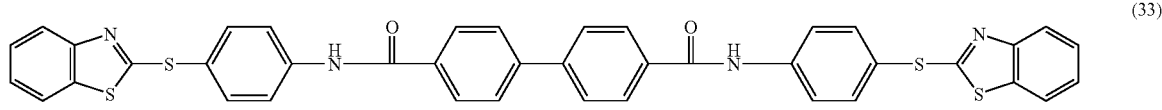
(33)
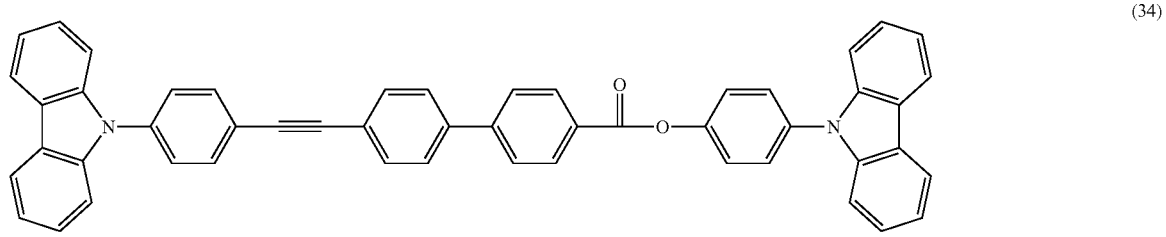
(34)
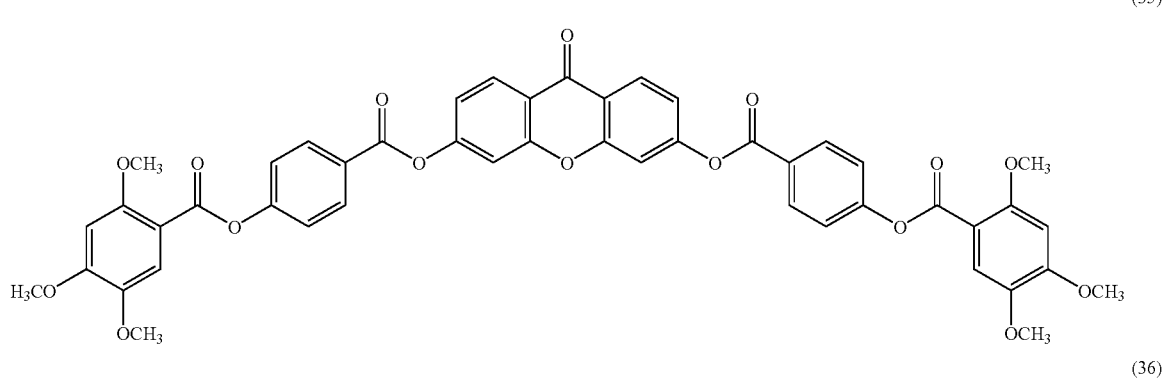
(35)
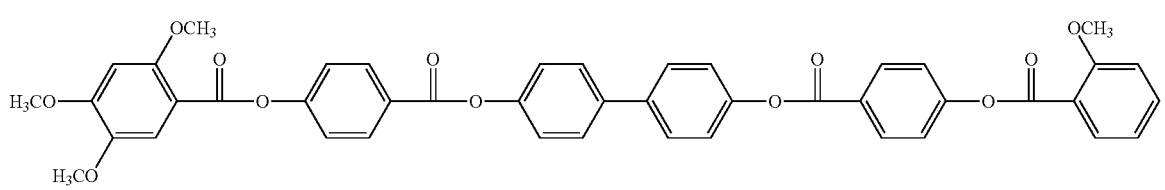
(36)

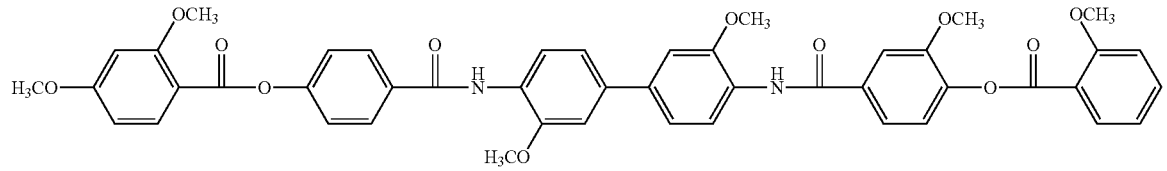

(37)

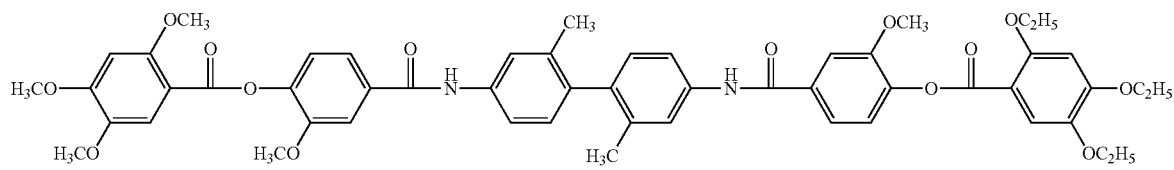

(38)

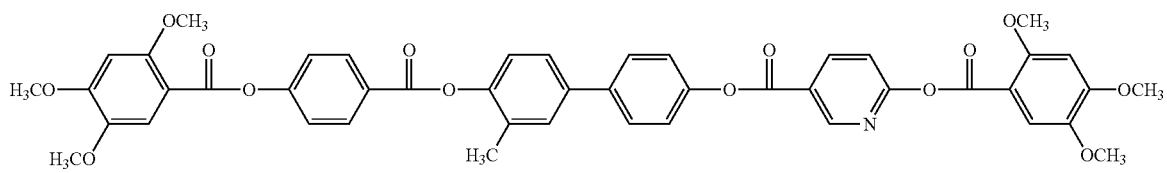

(39)

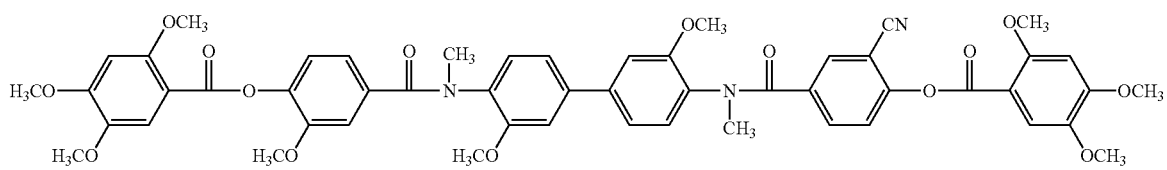

(40)

The optically anisotropic layer can be formed by applying to an alignment film surface a coating solution containing a liquid crystalline compound, and further a polymerization initiator, an average tilt-angle adjusting agent, if needed, and other optional additives (e.g., a plasticizer, a monomer, a surfactant, an alignment temperature lowering agent, a chiral agent).

(Fixation of Aligned-State of Liquid Crystalline Compound9

To a liquid crystalline compound brought into alignment, it is favorable that the aligned state thereof is kept and fixed. The aligned-state fixation is preferably carried out by polymerization reaction of polymerizable groups introduced into the liquid crystalline compound, or by polymerization reaction of a monomer having a multifunctional polymerizable group. Herein, though the polymerization reactions each include thermal polymerization reaction using a thermal polymerization initiator and photo polymerization reaction using a photo-polymerization initiator, the photo polymerization reaction is preferable. Examples of a photo-polymerization initiator include the α-carbonyl compounds described in U.S. Pat. Nos. 2,357,661 and 2,367,670, the acyloin ethers described in U.S. Pat. No. 2,448,828, the α-hydrocarbo-substituted aromatic acyloin compounds described in U.S. Pat. No. 2,722,512, the polynuclear quinone compounds described in U.S. Pat. Nos. 3,046,127 and 2,951,758, the combinations of triarylimidazole dimers with p-aminophenyl ketones described in U.S. Pat. No. 3,549,367, the acridine and phenazine compounds described in JP-A-60-105667 and U.S. Pat. No. 4,239,850 and the oxadiazole compounds described in U.S. Pat. No. 4,212,970.

The amount of photo-polymerization initiator used is preferably from 0.01 to 20 mass %, far preferably from 0.5 to 5 mass %, of the total solids in a coating solution. The light irradiation for polymerization of a liquid crystalline compound is preferably irradiation with UV rays. The irradiation energy is preferably from 20 mJ/cm$^2$ to 50 J/cm$^2$, far preferably from 100 to 800 mJ/cm$^2$. In order to promote the photo polymerization reaction, light irradiation may be carried out under a heating condition. The thickness of an optically anisotropic layer formed is preferably from 0.1 to 10 μm, far preferably from 0.5 to 5 μm.

As mentioned above, it is appropriate that the optically anisotropic layer be formed by applying to an alignment film surface a coating solution containing a liquid crystalline compound, a polymerization initiator as recited above and other additives. As a solvent used for preparing the coating solution, an organic solvent is suitable. Examples of such an organic solvent include amides (e.g., N,N-dimethylformamide), sulfoxides (e.g., dimethyl sulfoxide), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-imethoxyethane). Of these solvents, alkyl halides and ketones are preferred over the others. Two or more of those solvents may be used together. The application of a coating solution can be carried out using any of known methods (e.g., an extrusion coating method, a direct gravure coating method, a reverse gravure coating method and a die coating method).

(Alignment Film)

When the optically anisotropic layer is formed from a liquid crystalline compound, it is appropriate, as mentioned above, to use an alignment film for the purpose of bringing the liquid crystalline compound into alignment. The alignment film can be provided using a known method, such as rubbing treatment of an organic compound (preferably a polymer), oblique evaporation of an inorganic compound, formation of a layer having micro groups, or accumulation of an organic compound (e.g., ω-tricosanoic acid, dioctadecyldimethylammonium chloride, methyl stearate) in accordance with the Langmuir-Blodgett technique (LB film formation). Further, there are known alignment films capable of developing an alignment function by application of an electric field or a magnetic field or by irradiation with light. Of these alignment films, alignment films formed by rubbing treatment of polymers are especially preferred. The rubbing treatment is performed by the surface of a polymer layer being rubbed in a given direction with paper or cloth over several times.

The type of a polymer used in an alignment film can be decided depending on the orientation (notably an average tilt angle) of a liquid crystalline compound. In order to orient the liquid crystal compound in, e.g., a horizontal direction, polymers not lowering the surface energy of an alignment film (usual polymers used for orientation purposes) are used. Descriptions of specific types of such polymers can be found in a wide variety of documents concerning liquid crystal cells and optical compensation sheets. In a specific case where the liquid crystal compound is oriented in a direction orthogonal to the direction of rubbing treatment in the invention, the modified polyvinyl alcohol described in JP-A-2002-62427, the acrylic acid copolymer described in JP-A-2002-98836, and the polyimide and the polyamic acid described in JP-A-2002-268068 can be used to advantage. Any alignment film preferably has polymerizable groups for the purpose of enhancing adhesion to the liquid crystalline compound and a transparent support. The polymerizable groups can be introduced in the form of repeating units having them in side chains or as substituents of cyclic groups. It is preferable by far to use an alignment film capable of forming chemical bonds with a liquid crystalline compound at the interface to the liquid crystalline compound. Descriptions of such an alignment film can be found in JP-A-9-152509.

The thickness of alignment film is preferably from 0.01 to 5 μM, far preferably from 0.05 to 2 μm.

It's also all right that a liquid crystalline compound is aligned by use of an alignment film and then fixed as it is in an aligned state, thereby forming an optically anisotropic layer, and the optically anisotropic layer alone is transferred onto the cellulose acylate film.

As to Re(590) of the optically anisotropic layer in the invention, the Re value in the width direction is required to be greater than the Re value in the length direction. Therefore, the Re(590) value is required to be smaller than the Re(590) of the cellulose acylate film. The difference between them is preferably from 0 to 100 nm, preferably from 20 to 90 nm.

The following is a detailed description of a polarizing plate for use in the invention. The polarizing plate is made up of a polarizer and two protective films arranged on both sides of the polarizer, and at least one of the protective films is the present optical compensation sheet.

(Polarizer)

The polarizer used in the invention has no particular restrictions, but any polarizers hitherto known can be used. An example of usable polarizers is a polarizer formed by adsorbing a dichroic material including iodine and/or a dichroic dye, such as an azo dye, an anthraquinone dye or a tetrazine dye, to a film of hydrophilic polymer, such as polyvinyl alcohol, partially formalated polyvinyl alcohol or partially saponified ethylene-vinyl acetate copolymer, and subjecting the film to stretch alignment processing. In the invention, it is preferable to adopt the stretching methods described in JP-A-2002-131548, especially the method of using a tenter stretching machine of width-direction uniaxial stretching type, thereby rendering the absorption axis of the polarizer substantially orthogonal to the direction of the length. The use of a tenter stretching machine of width-direction uniaxial stretch type can eliminate the need for using an alignment film for aligning the liquid crystalline compound in a direction orthogonal to the direction of rubbing processing as the alignment film used for the first optically anisotropic layer, and enables the use of usual alignment films, so it is advantageous from the viewpoint of cost and defects by alignment.

The both sides of a polarizer are usually protected with a protective film, and at least one of the protective films is the present optical compensation sheet. When a different film is used as the other protective film, it has no particular restrictions, and it may be any of transparent protective films made from celluloses, such as cellulose acetate, cellulose acetate butyrate and cellulose propionate, polycarbonate, polyolefin, polystyrene and polyester.

The protective films are supplied in the form of roll, and continuously laminated on both surfaces of a long length of polarizer so that the length directions thereof is in accordance with the length direction of the polarizer. Herein, the alignment axes (slow axes) of the protective films, though may be in any directions, are favorably parallel to the length direction from the viewpoint of easy operation. Further, the angles which the slow axes (alignment axes) of the protective films form the absorption axis (stretching axis) of a polarizer have no particular restrictions, and they can be set appropriately according to the end-use purpose of a polarizing plate prepared.

When the polarizer is made with the stretching machine of width-direction uniaxial stretch type, which is preferably used in the invention, the slow axes (alignment axes) of the protective films becomes substantially orthogonal to the absorption axis (stretching axis) of the polarizer.

The retardation of a transparent protective film is preferably 10 nm or below, far preferably 5 nm or below, at, e.g., 632.8 nm. From the viewpoint of such low retardation, the transparent protective film favorably used is a film of cellulose triacetate or a film of polyolefin, such as ZEONEX or ZEONOR (produced by Zeon Corporation), or ARTON (produced by JSR Corporation). In addition, the non-birefringent optical resin materials as described in JP-A-8-110402 and JP-A-11-293116 can be used. When cellulose acetate film is used as a transparent protective film, it is appropriate that the retardation be controlled to less than 3 nm, preferably 2 nm or below, for the purpose of holding a retardation change by hot and humid surroundings small.

From the viewpoint of preventing deviation of the optical axes from alignment and the entry of foreign matter including dirt, it is advantageous in the invention that the optically anisotropic layer and the polarizer are bonded together. To such bonded lamination, an appropriate mode, such as an adhesion mode via a transparent adhesive layer, can be applied. The adhesive used therein is not particularly restricted as to its type. However, from the viewpoint of preventing changes in optical characteristics of constituent members, it is preferable to choose an adhesive not requiring a high-temperature process for curing and drying during the adhesion operation. In this respect, it is advantageous to use a hydrophilic polymer adhesive or a pressure-sensitive adhesion layer.

For forming the pressure-sensitive adhesion layer, it is possible to use a transparent pressure-sensitive adhesive including an appropriate polymer, such as acrylic polymer, silicone polymer, polyester, polyurethane, polyether or synthetic rubber. Of these pressure-sensitive adhesives, pressure-sensitive adhesives of acrylic type are preferred over the others in terms of optical transparency, pressure-sensitive adhesion characteristic and weather resistance. Such pressure-sensitive adhesion layers can also be provided on one side or both sides of the polarizing plate for the purpose of adhesion to an adherend or adherends, including a liquid crystalline cell, as required. In this case, it is preferable that a separator or the like is temporarily made to adhere to an exposed surface of the pressure-sensitive adhesion layer until the polarizing plate is put into active use, thereby preventing the pollution of the surface of the pressure-sensitive adhesion layer.

The present polarizing plate may be a polarizing plate having on one side or both sides thereof appropriate functional layers for prevention of surface reflection, such as an antireflection layer and/or an antiglare layer. The antireflection layer can be appropriately formed as a light interference coating, e.g., a fluorine-containing polymer coating or a multilayer metal-evaporated film. The antiglare layer can be formed using a proper method for diffusing light reflected from the layer surface, e.g., a method of coating a resin layer containing fine particles or a method of imparting microscopic asperities to the layer surface in an appropriate mode, such as an emboss processing mode, a sand blast processing mode or an etch processing mode.

The fine particles usable for the foregoing purpose have an average particle size ranging, e.g., from 0.5 to 20 µm, and examples thereof include fine particles of an inorganic compound which may have conductivity, such as silica, calcium oxide, alumina, titania, zirconia, tin oxide, indium oxide, cadmium oxide or antimony oxide, and fine particles of an appropriate organic polymer in a crosslinked or uncrosslinked state, such as polymethyl methacrylate or polyurethane. Only one kind or two or more kinds of fine particles chosen appropriately from those recited above may be used. Further, the foregoing adhesive layer or pressure-sensitive adhesion layer may contain such fine particles and show light diffusibility (Optical Performance of Polarizing Plate)

Optical properties and durability (short-term and long-term storage qualities) of the present polarizing plate is preferably equivalent or superior to those of commercially available super-high contrast articles (e.g., HLC2-5618 made by Sanritz Corporation). More specifically, it is appropriate that the visible-light transmittance be 42.5% or above, the polarization degree expressed by $\{(Tp-Tc)/(Tp+Tc)\}^{1/2}$ (wherein Tp is parallel transmittance and Tc is cross transmittance) be 0.9995 or greater, and the rates of changes caused in light transmittance and polarization degree by the polarizing plate's being allowed to stand for 500 hours under the atmosphere of 60° C.-90% RH or under dry atmosphere of 80° C. be 3% or below, preferably 1% or below, and 1% or below, preferably 0.1% or below, respectively, in terms of absolute value.

<Multifunctional Polarizing Plate>

The present polarizing plate can be preferably used by being integrated into a multifunctional polarizing plate with an optical film having functional layers for better viewability of display, including an antireflection film, a brightness enhancement film, a hard coating layer, a forward scattering layer and an antiglare layer.

<Liquid Crystal Display>

A liquid crystal display in which the polarizing plate including the present optical compensation sheet is used to advantage is explained below.

FIG. 1 is a schematic diagram showing an example of the liquid crystal display according to the invention. In FIG. 1, the liquid crystal display 10 is made up of a liquid crystal cell having a liquid crystal layer 7, an electrode substrate 5 arranged on the upper side of the liquid crystal cell and an electrode substrate 12 arranged on the lower side of the liquid crystal cell, an upper polarizing plate 1 and a lower polarizing plate 12 arranged on both sides of the liquid cell. A color filter may be placed between the liquid cell and a polarizer. When the liquid crystal display is used in a transmission mode, a blacklight using as a light source a light emitting diode, a field emission element or an electroluminescent element is provided on the back of the display. On the other hand, when the display is used in a reflection mode, one polarizing plate has only to be arranged on the image viewing side, and a reflective film is provided on the back of the liquid crystal cell or inside the under substrate of the liquid crystal cell. Of course, it is possible to provide a front light using the light source as mentioned above on the viewing side of the liquid crystal cell.

In the present liquid crystal display, it is preferable that a transparent protective film, a polarizer and the present optical compensation sheet are laminated in the order of mention from the outer side to the inner side of the display (in decreasing order by distance from the liquid crystal cell). As to the type of liquid crystal display, there are, e.g., a liquid crystal display of direct image viewing type, that of a image projection type and that of a light modulation type. The present invention is effectively applied to an active matrix liquid crystalline display using 3- or 2-terminal semiconductor devices, such as TFT or MIM. Needless to say, the invention is also useful in a passive matrix liquid crystal display, typified by the STN mode referred to as a time-shared derive.

(VA Mode)

The present liquid crystal display is preferably a VA mode liquid crystal display.

In the VA mode liquid crystal display, a liquid crystal having a negative dielectric anisotropy of the order of $\Delta\epsilon\text{-}=4.6$ and a refractive index anisotropy of the order of $\Delta n=0.0813$ is formed into a layer between an upper substrate and a lower substrate so that the director indicating the alignment direction of liquid crystal molecules, the so-called a tilt angle, is adjusted to about 89° by rubbing orientation treatment. The thickness (d) of the liquid crystal layer 7 is set at 3.5 µm. Herein, the brightness at the time of white display varies with the magnitude of the product of a thickness d and a refractive index anisotropy $\Delta n$ (namely $\Delta n \cdot d$). Therefore, the product is set so as to fall within the range of 0.2 to 0.5 µm in order to obtain the maximum brightness.

The polarizing plate 1 and the polarizing plate 2 are laminated on the upper side and the lower side of the liquid crystal cell, respectively, in a condition that the absorption axis 2 of the polarizing plate 1 is almost orthogonal to the absorption axis 13 of the polarizing plate 12. Transparent electrodes (not shown in FIG. 1) are formed inside the alignment films provided on the electrode substrate 5 lying atop the liquid crystal cell and on the electrode substrate 8 lying beneath the liquid crystal cell, respectively. In a non-driven state that no driving voltage is applied to the electrodes, the liquid crystal molecules in the liquid crystal layer 7 are aligned in a direction nearly vertical to the substrate surface; as a result, almost no change occurs in the polarized state of light passing through the liquid crystal panel. In other words, the liquid crystal display achieves an ideal black display in the non-driven state. In a driven state, on the other hand, the liquid crystal molecules tilt to the direction parallel to the substrate surface, and the polarized state of light passing through the liquid crystal panel is changed by these tilted liquid crystal molecules. In other words, the liquid crystal display provides a white display in a driven state. Incidentally, the reference numerals 6 and 9 in FIG. 1 indicate the direction of alignment control.

In this case, since application of electric field is carried out between the upper and lower substrates, a liquid crystal material negative in dielectric constant anisotropy is used so that the liquid crystal molecules respond vertically to the direction of the electric field. In another case where the electrodes are arranged on one substrate and the electric field is applied in a lateral direction parallel to the substrate surface, a liquid crystal material positive in dielectric constant anisotropy is used.

In the VA mode liquid crystal display, addition of a chiral material, which is generally used in a TN-mode liquid crystal display, is hardly made because it causes deterioration in dynamic response characteristics. However, a chiral material may be added with the intention of lessening poor alignment.

Features of a VA mode liquid crystal display are high-speed response and high contrast. However, it has a problem that the contrast is high when viewed from the front but lowered when viewed from the oblique direction. At the time of black display, the liquid crystal molecules are aligned vertically to the substrate surface. When viewed from the front, the transmittance is low since the liquid crystal molecules show no birefringence, and high contrast is obtained. On the other hand, when viewed from an oblique direction, the liquid crystal molecules develop birefringence. Further, the crossing angle between the absorption axes of the upper and lower polarizing plates is the right angle of 90° when viewed from the front, but it becomes greater than 90° when viewed from the oblique direction. Because of these two factors, leakage light develops in the oblique direction to result in lowering of contrast. In order to solve this problem, the present optical compensation sheet is arranged.

At the time of white display, the liquid crystal molecules are in a tilted state, and their birefringence in the tilted direction and their birefringence in the reverse direction are different in magnitude when viewed from the oblique direction; as a result, there occur differences in brightness and hue. In order to solve this problem, every critical area in the liquid crystal display is designed so as to have the so-called multi-domain structure wherein every critical area is divided into a plurality of domains.

(Multi-Domain)

For instance, the viewing angle characteristics of liquid crystalline molecules are leveled off in the VA mode by the molecules' being tilted variously in a plurality of domains in every critical area upon application of an electric field. For orientation division in each critical area, slits or protrusions are formed on the electrodes and thereby the direction of electric field is made to vary with domain or the electric-field density is biased. In order to equalize viewing angles in all directions, it is convenient to increase the number of divisions. Specifically, viewing angles can be made almost uniform by at least four-part division or eight-part division. The eight-part division in particular is preferred because the absorption axes of polarizing plates can be set at arbitrary angles.

However, on the borders between domains for orientation division, liquid crystal molecules respond hard. Therefore, black display is retained normally to cause a problem of lowering the brightness. So a chiral agent may be added to a liquid crystalline material and thereby reduce the boundary area.

The invention will now be illustrated in more detail by reference to the following examples, but these examples should not be construed as limiting the scope of the invention.

EXAMPLE 1

In a reaction vessel equipped with a refluxing device, 100 parts by mass of cellulose (hardwood pulp) and 160 parts by mass of acetic acid were placed, and stirred for 2 hours at an inside temperature of 40° C. The thus pretreated cellulose took on the shapes of from fine powder to feathers by being swollen, broken and crushed.

Aside from the pretreatment, a mixture of 920 parts by mass of butyric anhydride and 10 parts by mass of sulfuric acid was prepared as an acylation agent, cooled to −20° C., and then added to the reaction vessel in which the pretreated cellulose was stored. After a lapse of 30 minutes, the temperature inside the reaction vessel was raised to 20° C. and the cellulose underwent reaction with the acylation agent for 5 hours. Thereafter, the temperature inside the reaction vessel was cooled to 5° C., and thereto 2,400 parts by mass of a 12.5 mass % of aqueous acetic acid solution cooled at about 5° C. was added over a period of one hour. Then, the inside temperature was raised to 30° C. and the stirring was continued for 1 hour. A mixture solution was prepared by mixing and dissolving magnesium acetate tetrahydrate in an amount equivalent to twice by mole the amount of the sulfuric acid catalyst used in water in the equivalent amount by mass and acetic acid in the equivalent amount by mass, added to the reaction vessel and further stirred for 30 minutes. Further, 1,000 parts by mass of acetic acid and 2,500 parts by mass of a 50 mass % of aqueous acetic acid solution were added gradually to the reaction vessel to precipitate cellulose acetate butyrate. The cellulose acetate butyrate precipitate obtained was thoroughly washed with hot water. After the washing, the resulting precipitate was stirred in a 0.005 mass % of water solution of calcium hydroxide for 0.5 hour, washed with water until the pH of the washing solution became 7, and then dried at 70° C. The thus obtained cellulose acetate butyrate was found to have an acetylation degree of 1.12, a butyrylation degree of 1.81 and a polymerization degree of 280.

1. Cellulose Acylate Resin

The following films were made from the cellulose acylate prepared using the synthesis method described above.

To the cellulose acylate to which the retardation elevating agent symbolized by A-12 was added in a proportion of 3 mass % or the cellulose acylate to which no retardation elevating agent was added, biphenyldiphenyl phosphate as a plasticizer was further added in a proportion of 2 mass %. Moreover, particulate silicone dioxide as a matting agent (Aerosil $R^{972}V$, produced by Nippon Aerosil Co., Ltd.) was added thereto in a proportion of 0.05 mass %. In addition, the following compound as an oxidation-and-degradation inhibitor was added in a proportion of 0.15 mass %.

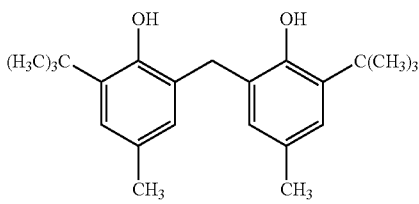

Thereto were furthermore added as UV absorbents 2,4-bis (n-octylthio)-6-(4-hydroxy-3,5-di-tert-butylanilino)-1,3,5-triazine in a proportion of 0.4 mass % and 2-(2'-hydroxy-3', 5'-di-tert-butylphenyl)-5-chlorobenzotriazole in a proportion of 0.2 mass %.

Additionally, all proportions (mass %) expressing the amounts of additives added in the invention are based on the amount of cellulose acylate used. For example, the expression "a proportion of 5 mass %" means that an additive is added in an amount of 5 parts by mass to 100 parts by mass of cellulose acylate.

2. Melt Film Formation

The foregoing mixtures of cellulose acylate with additives were each molded into columnar pellets 3 mm in diameter and 5 mm in length, reduced to 0.1% or below in water content by drying with a 100° C. vacuum drier, and subjected to melt-extrusion using a uniaxial extruder under the following screw conditions.

Screw compression ratio: 3
Screw L/D (length/diameter) ratio: 35 (vent-side diameter: 60 mm)
Screw temperature pattern: Upstream feed part (180 to 195° C.), intermediate compression part (200 to 210° C.), downstream metering part (220 to 240° C.)
Number of revolutions: 80 rpm (passage time: 3 minutes)

Each cellulose acylate thus molten was passed through a gear pump to remove ripples arising from the extruder, and further filtered through a 3-μm metal mesh metal filter. The filtered melt was cast onto a cast drum via a die lip set at 230° C. Then, the thus cast matter was solidified by being successively passed along 60-cm-dia three cast drums set at Tg-5° C., Tg and Tg-10° C., respectively. Thus, a cellulose acylate film having a thickness of 150 μm was obtained. Additionally, the distance between the tip of the die lip from which melt was extruded and the grounding position of the melt on the cast drum was adjusted to 5 cm, and in this space 3-kV electrodes were placed at a distance of 5 cm from the melt and both edges of the melt were trimmed away by 5 cm each through static voltage application treatment. After trimming 5 cm from each edge, the resulting edges were subjected to knurling processing so as to have knurls 10 mm in width and 50 μm in height, and then the resulting film was wound into a roll. On every level, the width was 1.5 m and 2,000 m of film was wound at a speed of 30 m/min.

3. Stretching

Each of the cellulose acylate films obtained by the foregoing melt film formation was preheated with several preheat rolls, and then stretched while varying lengthwise and widthwise stretch ratios by use of nip rolls and a clip widthwise stretch tenter. The stretching was carried out within the temperature range of Tg to Tg+20° C., wherein Tg stands for the Tg of each resin from which the intended film is formed.

Next an optically anisotropic layer was made.

(Making of Optically Anisotropic layer)

Each of the cellulose acylate films formed was coated with the following alignment film, and further thereto a coating solution having the following composition (1) or (2) was applied at a coverage of 5 ml/m² by means of a wire-bar coater, and heated at 80° C. for 2 minutes to align the liquid crystalline compound. Then, the liquid crystalline compound was polymerized at 50° C. under irradiation with 250-mJ/cm² UV light from a high-pressure mercury lamp.

| (Composition of Coating Solution for Alignment Film) | |
|---|---|
| Modified polyvinyl alcohol shown below | 20 parts by mass (weight) |
| Water | 360 parts by mass |
| Methanol | 120 parts by mass |
| Glutaraldehyde (cross-linking agent) | 1 parts by mass |

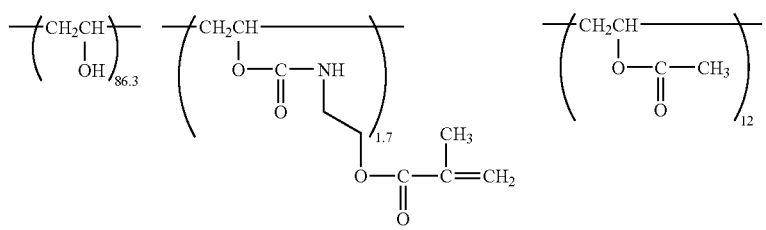

| (Composition (1) of Coating Solution for Optically Anisotropic Layer) | |
|---|---|
| Rod-shaped liquid crystalline compound I-1 | 91 parts by mass |
| Ethylene oxide-modified trimethylol-propane triacrylate (V#360, produced by Osaka Organic Chemical Industry Ltd.) | 9 parts by mass |
| Cellulose acetate butyrate (CAB531-1, produced by Eastman Chemical Company) | 1.5 parts by mass |
| Photopolymerization initiator (Irgacure 907, produced by Nihon Ciba-Geigy K.K.) | 3 parts by mass |

-continued

| | |
|---|---|
| Photo-sensitizer | 1 parts by mass |
| (Kayacure DETX, produced by Nippon Kayaku Co., Ltd.) | |
| Methyl ethyl ketone | 214.2 parts by mass |

(Composition (2) of Coating Solution for Optically Anisotropic Layer)

| | |
|---|---|
| Rod-shaped liquid crystalline compound (Exemplified Compound (1)) | 40 parts by mass |
| Ethylene oxide-modified trimethylol-propane triacrylate | 60 parts by mass |
| (V#360, produced by Osaka Organic Chemical Industry Ltd.) | |
| Cellulose acetate butyrate | 1.5 parts by mass |
| (CAB531-1, produced by Eastman Chemical Company) | |
| Photopolymerization initiator | 3 parts by mass |
| (Irgacure 907, produced by Nihon Ciba-Geigy K.K.) | |
| Photo-sensitizer | 1 parts by mass |
| (Kayacure DETX, produced by Nippon Kayaku Co., Ltd.) | |
| Methyl ethyl ketone | 214.2 parts by mass |

Figure 2:
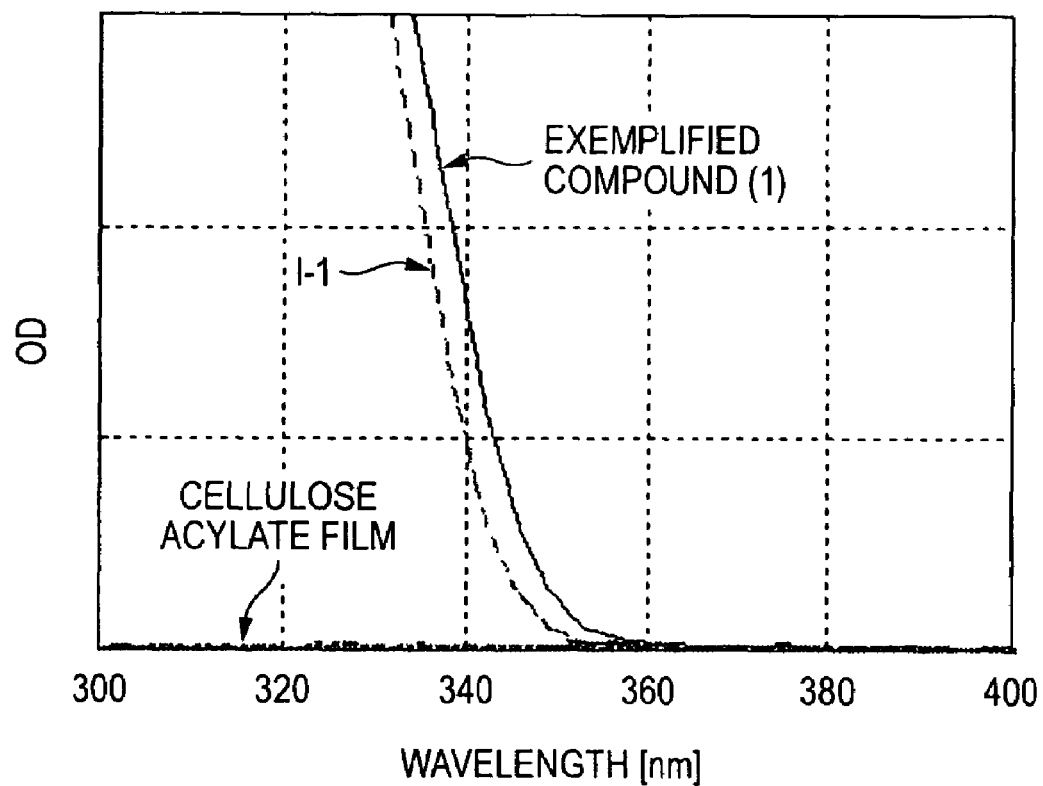
FIG. 2 shows absorption-wavelength plot patterns of cellulose acylate film, rod-shaped liquid crystalline compound I-1 and rod-shaped crystalline compound exemplified as (1).

Absorption-wavelength plot patterns of the film of cellulose acylate prepared by the foregoing synthesis method, the rod-shaped liquid crystalline compound I-1 and the rod-shaped liquid crystalline compound exemplified as (1) are shown in FIG. 2. Measurements of the absorption wavelengths were made with UV-3150 made by Shimadzu Corporation.

Characteristics of cellulose acylate films as substrates and characteristics of optical compensation sheets having optically anisotropic layers on the cellulose acylate films are shown in Table 1. Each cellulose acylate film and each optically anisotropic layer were laminated so that the slow axis of the cellulose acylate film was orthogonal to the slow axis of the optically anisotropic layer.

A liquid crystal display as shown in FIG. 1 was made using each of the polarizing plates. The liquid crystal display was made up of a liquid crystal cell having a liquid crystal layer 7, an electrode substrate 5 placed on the upper part of the liquid crystal cell and an electrode substrate 8 placed on the lower art of the liquid crystal cell, and an upper polarizing plate 1 and the lower polarizing plate 12 arranged on both sides of the liquid crystal cell. More specifically, from the direction of viewing (from the above), the upper polarizing plate 1, a VA mode liquid crystal cell (the upper liquid crystal cell electrode substrate 5, the liquid crystal layer 7, the lower liquid crystal cell electrode substrate 8) and the lower polarizing plate 12 were laminated in the order of mention, and further a backlight light source was arranged.

TABLE 1

| Sample No. | Cellulose acylate film | | Optically anisotropic layer | Retardation after stretching | | | | | |
|---|---|---|---|---|---|---|---|---|---|
| | Elevating agent | Stretch ratio | | Re(446) | Re(590) | Re(749) | Rth(446) | Rth(590) | Rth(749) |
| 1* | absent | 1.1 × 1.9 | absent | 53 | 65 | 71 | 119 | 142 | 147 |
| 2* | present | 1.1 × 1.9 | absent | 100 | 102 | 105 | 220 | 224 | 236 |
| 3 | absent | 1.1 × 1.9 | (1) | 47 | 60 | 63 | 180 | 170 | 168 |
| 4 | present | 1.1 × 1.9 | (2) | 51 | 55 | 61 | 240 | 230 | 224 |
| 5* | present | 1.1 × 1.9 | (1) | 55 | 53 | 54 | 184 | 185 | 184 |

Sample numbers with * are comparative examples, and the others are examples of the invention.

(Making of Polarizing Plate)

On both sides of a polarizer (thickness: 20 μm) made by stretching longitudinally while providing a peripheral speed difference between two pairs of nip rolls in accordance with Example 1 of JP-A-2001-141926, each of the optical compensation sheets (Sample Nos. 1 to 5) and Fuji Tack TD80 having undergone saponification treatment were laminated using a 3% aqueous solution of PVA (PVA-117H, produced by Kuraray Co., Ltd.) as an adhesive so that the polarizer was sandwiched between them. The resulting laminate was dried and cured for 72 hours in a 40° C. oven. Thus, polarizing plates 1 to 5 were made individually. Each optical compensation sheet was laminated so that the optically anisotropic layer thereof faced the air. The thus made polarizing plates each had a transmittance of 42% and a polarization degree of 99.9%.

<Making Liquid Crystal Cell>

A liquid crystal cell was made as follows: A cell-gap between the substrates was set at 3.6 μm, and a liquid crystal material negative in dielectric constant anisotropy (MLC6608, produced by Merck KGaA) was dripped into the space between the substrates and sealed therein, thereby forming a liquid crystal layer between the substrates. The retardation of the liquid crystal layer (namely, the product Δn·d of thickness d (μm) and refractive index anisotropy Δn of the liquid crystal layer) was adjusted to 275 nm. The liquid crystal material was aligned so as to have vertical orientation.

In making the liquid crystal display using the vertical alignment type liquid crystal cell, two sheets of each polarizing plate prepared in Example were used as the upper polarizing plate 1 and the lower polarizing plate 12, respectively, and laminated on the observer side and on the backlight side of the liquid crystal cell, respectively, with the aid of a pressure-sensitive adhesive so that their respective optical compensation sheets were arranged on the side of the liquid crystal cell. Herein, the cross-Nicol arrangement was adopted so that the transmission axis of the polarizing plate on the observer side was oriented in the top-bottom direction and the transmission axis of the polarizing plate on the backlight side was oriented in the left-right direction.

<Evaluation of Change in Hue>

Hue change occurring at a viewing angle of 60° was examined on each the liquid crystal displays made in Example. As a result, it was found that the liquid crystal displays using the present optical compensation sheets of Sample Nos. 3 and 4 (present polarizing plates 3 and 4) were reduced in hue change and had improved color-viewing angles.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-82724, filed Mar. 22 of 2005, the contents of which is incorporated herein by reference.

What is claimed is:

1. An optical compensation sheet comprising a cellulose acylate film having optical anisotropy and satisfying expressions (1) to (3), $$2.6 \leq X+Y \leq 3.0 \qquad \text{Expression (1)}$$

$$1.0 \leq X \leq 1.8 \qquad \text{Expression (1)}$$

$$1.0 \leq Y \leq 3.0 \qquad \text{Expression (1)}$$

wherein X represents a substitution degree of acetyl group and Y represents a total sum of substitution degrees of propionyl, butanoyl, pentanoyl and hexanoyl groups; and an optically anisotropic layer having a slow axis orthogonal to a slow axis of the cellulose acylate film, wherein the optical compensation sheet has retardations satisfying the following relations (3) and (4);

$$5 < Re(749) - Re(446) > 100 \qquad (3)$$

$$5 < Rth(446) - Rth(749) > 100 \qquad (4)$$

wherein $Re(\lambda)$ is an in-plane retardation by nm at a wavelength of $\lambda$ nm; and $Rth(\lambda)$ is a thickness-direction retardation by nm at a wavelength of $\lambda$ nm.

2. The optical compensation sheet according to claim 1, wherein the optically anisotropic layer has an optical absorption end at a wavelength longer than a wavelength at which the cellulose acylate film has an optical absorption end.

3. The optical compensation sheet according to claim 1, wherein the optically anisotropic layer has an Re(590) smaller than an Re(590) of the cellulose acylate film, and $Re(\lambda)$ is an in-plane retardation by nm at a wavelength of $\lambda$ nm.

4. A polarizing plate comprising: a polarizer; and two protective films, the polarizer being between the two protective films, wherein at least one of the two protective films is an optical compensation sheet according to claim 1.

5. A liquid crystal display comprising: a liquid crystal cell; and two polarizing plates, the liquid crystal cell being between the two polarizing plates, wherein at least one of the two polarizing plates is a polarizing plate according to claim 4.

6. The liquid crystal display according to claim 5, wherein the liquid crystal cell is a VA mode liquid crystal cell.

7. An optical compensation sheet comprising: a cellulose acylate film having optical anisotropy and in expressions (1) to (3), $$2.6 \leq X+Y \leq 3.0 \qquad \text{Expression (1)}$$

$$1.0 \leq X \leq 1.8 \qquad \text{Expression (1)}$$

$$1.0 \leq Y \leq 3.0 \qquad \text{Expression (1)}$$

wherein X represents a substitution degree of acetyl group and Y represents a total sum of substitution degrees of propionyl, butanoyl, pentanoyl and hexanoyl groups; and an optically anisotropic layer having a slow axis orthogonal to a slow axis of the cellulose acylate film, and the optical compensation sheet has retardations satisfying relations (1) and (2):

$$Re(446) < Re(590) < Re(749) \qquad (1)$$

$$Rth(446) < Rth(590) < (749) \qquad (4)$$

wherein $Re(\lambda)$ is an in-plane retardation by nm at a wavelength of $\lambda$ nm; and $Rth(\lambda)$ is a thickness-direction retardation by nm at a wavelength of $\lambda$ nm.

8. The optical compensation sheet according to claim 7, which has retardations satisfying the following relations (3) and (4), $$5 < Re(749) - Re(446) < 100 \qquad (3)$$

$$5 < Rth(446) - Rth(749) < 100 \qquad (4).$$

9. The optical compensation sheet according to claim 7, wherein the optically anisotropic layer has an optical absorption end at a wavelength longer than a wavelength at which the cellulose acylate film has an optical absorption end.

10. The optical compensation sheet according to claim 7, wherein the optically anisotropic layer has an Re(590) smaller than an Re(590) of the cellulose acylate film.

11. A polarizing plate comprising: a polarizer; and two protective films, the polarizer being between the two protective films, wherein at least one of the two protective films is an optical compensation sheet according to claim 7.

12. A liquid crystal display comprising: a liquid crystal cell; and two polarizing plates, the liquid crystal cell being between the two polarizing plates, wherein at least one of the two polarizing plates is a polarizing plate according to claim 11.

13. The liquid crystal display according to claim 12, wherein the liquid crystal cell is a VA mode liquid crystal cell.

* * * * *